United States Patent
Endo et al.

(10) Patent No.: US 10,768,741 B2
(45) Date of Patent: Sep. 8, 2020

(54) SEMICONDUCTOR DEVICE, DISPLAY DEVICE AND METHOD OF OPERATING THE SAME

(71) Applicant: Creative Legend Semiconductor (Hong Kong) Limited, Hong Kong (CN)

(72) Inventors: Kazuya Endo, Tokyo (JP); Shinobu Nohtomi, Tokyo (JP); Atsushi Shikata, Tokyo (JP); Kentaro Suzuki, Tokyo (JP)

(73) Assignee: Creative Legend Semiconductor (Hong Kong) Limited, Hong Kong (CN)

( * ) Notice: Subject to any disclaimer, the term of this patent is extended or adjusted under 35 U.S.C. 154(b) by 35 days.

(21) Appl. No.: 15/982,628

(22) Filed: May 17, 2018

(65) Prior Publication Data
US 2018/0335888 A1 Nov. 22, 2018

(30) Foreign Application Priority Data
May 19, 2017 (JP) ................................ 2017-100041

(51) Int. Cl.
- G06F 3/041 (2006.01)
- G06F 3/044 (2006.01)
- G09G 3/36 (2006.01)

(52) U.S. Cl.
CPC ............ G06F 3/0416 (2013.01); G06F 3/044 (2013.01); G09G 3/3614 (2013.01); G09G 3/3688 (2013.01); G09G 2320/0219 (2013.01)

(58) Field of Classification Search
CPC ...... G06F 3/0416; G06F 3/044; G06F 3/0412; G09G 3/3614; G09G 3/3688; G09G 2320/0219
See application file for complete search history.

(56) References Cited

U.S. PATENT DOCUMENTS

| | | | | |
|---|---|---|---|---|
| 2007/0126722 | A1* | 6/2007 | Hashimoto | G09G 3/3685 345/204 |
| 2008/0186289 | A1* | 8/2008 | Ijima | G06F 3/0412 345/175 |
| 2011/0050680 | A1* | 3/2011 | Chung | G09G 3/3688 345/214 |
| 2016/0202819 | A1* | 7/2016 | Chen | G06F 3/044 345/174 |

FOREIGN PATENT DOCUMENTS

JP 2015141556 A 8/2015

* cited by examiner

Primary Examiner — Brent D Castiaux
(74) Attorney, Agent, or Firm — Christensen O'Connor Johnson Kindness PLLC

(57) ABSTRACT

A semiconductor device configured to drive a display panel in a display period, and perform touch sensing on the display panel in a touch sensing period after the display period. In a last horizontal sync period of the display period, the semiconductor device drives a first source line with a drive voltage of a first polarity, and a second source line with a drive voltage of a second polarity different from the first polarity. is the semiconductor is configured to output a first dummy pulse having first polarity and a voltage level based on the second display data to the first source line in a transition period between the display period and the touch sensing period.

20 Claims, 29 Drawing Sheets

Fig. 5

| SOURCE OUTPUT | | S<6j-5> | S<6j-4> | S<6j-3> | S<6j-2> | S<6j-1> | S<6j> | AVERAGE |
|---|---|---|---|---|---|---|---|---|
| POLARITY | | POS. | NEG. | POS. | NEG. | POS. | NEG. | |
| COLOR | | R | G | B | R | G | B | |
| TIMING | ⋅ | 0.2V | -5.2V | 0.2V | -5.2V | 0.2V | -5.2V | -2.5V |
| | ⋅ | 0.2V | -5.2V | 0.2V | -5.2V | 0.2V | -5.2V | -2.5V |
| | (n-3)<sup>TH</sup> H LINE | 0.2V | -5.2V | 0.2V | -5.2V | 0.2V | -5.2V | -2.5V |
| | (n-2)<sup>TH</sup> H LINE | 0.2V | -5.2V | 0.2V | -5.2V | 0.2V | -5.2V | -2.5V |
| | (n-1)<sup>TH</sup> H LINE | 0.2V | -5.2V | 0.2V | -5.2V | 0.2V | -5.2V | -2.5V |
| | n<sup>TH</sup> H LINE TRANSITION | 0.0V | 0.0V | 0.0V | 0.0V | 0.0V | 0.0V | 0.0V |

$V0^+ = 5.2V$
$V0^- = -5.2V$
$V255^+ = 0.2V$
$V255^- = -0.2V$

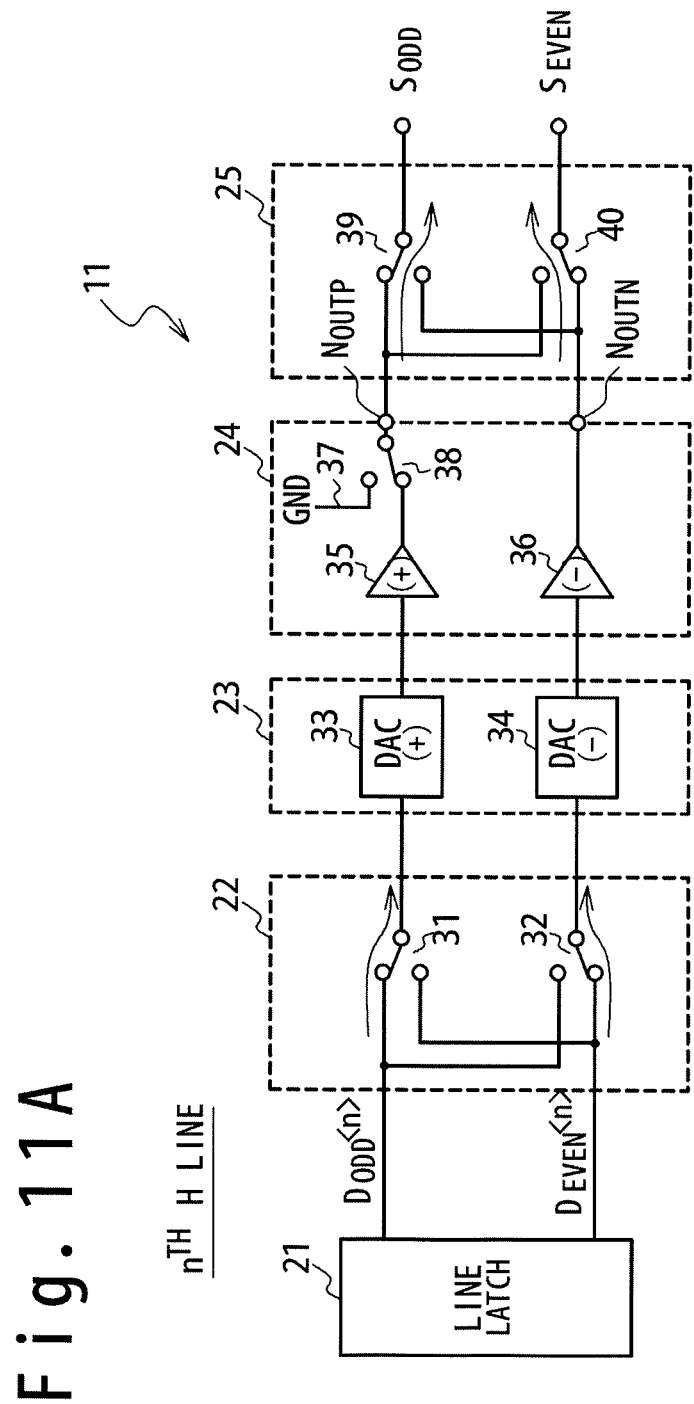

Fig. 12

| SOURCE OUTPUT | | | S<6j-5> | S<6j-4> | S<6j-3> | S<6j-2> | S<6j-1> | S<6j> | AVERAGE |
|---|---|---|---|---|---|---|---|---|---|
| | POLARITY | | POS. | NEG. | POS. | NEG. | POS. | NEG. | |
| | COLOR | | R | G | B | R | G | B | |
| TIMING | · | | 0.2V | -5.2V | 0.2V | -5.2V | 0.2V | -5.2V | -2.5V |
| | · | | 0.2V | -5.2V | 0.2V | -5.2V | 0.2V | -5.2V | -2.5V |
| | (n-3)$^{TH}$ H LINE | | 0.2V | -5.2V | 0.2V | -5.2V | 0.2V | -5.2V | -2.5V |
| | (n-2)$^{TH}$ H LINE | | 0.2V | -5.2V | 0.2V | -5.2V | 0.2V | -5.2V | -2.5V |
| | (n-1)$^{TH}$ H LINE | | 0.2V | -5.2V | 0.2V | -5.2V | 0.2V | -5.2V | -2.5V |
| | n$^{TH}$ H LINE DUMMY PULSE OUTPUT | | 5.2V | -0.2V | 5.2V | -0.2V | 5.2V | -0.2V | 2.5V |
| | TRANSITION | | 0.0V | 0.0V | 0.0V | 0.0V | 0.0V | 0.0V | 0.0V |

| REGISTER VALUE | DISPLAY DATA TO BE REFERRED TO |
|---|---|
| 0 | LAST H LINE |
| 1 | LAST 2 H LINES |
| 2 | LAST 3 H LINES |
| 3 | LAST 4 H LINES |
| 4 | LAST 5 H LINES |
| 5 | LAST 6 H LINES |
| 6 | LAST 7 H LINES |
| 7 | LAST 8 H LINES |
| 8 | LAST 9 H LINES |
| 9 | LAST 10 H LINES |
| 10 | LAST 11 H LINES |
| 11 | LAST 12 H LINES |
| 12 | LAST 13 H LINES |
| 13 | LAST 14 H LINES |
| 14 | LAST 15 H LINES |
| 15 | LAST 16 H LINES |

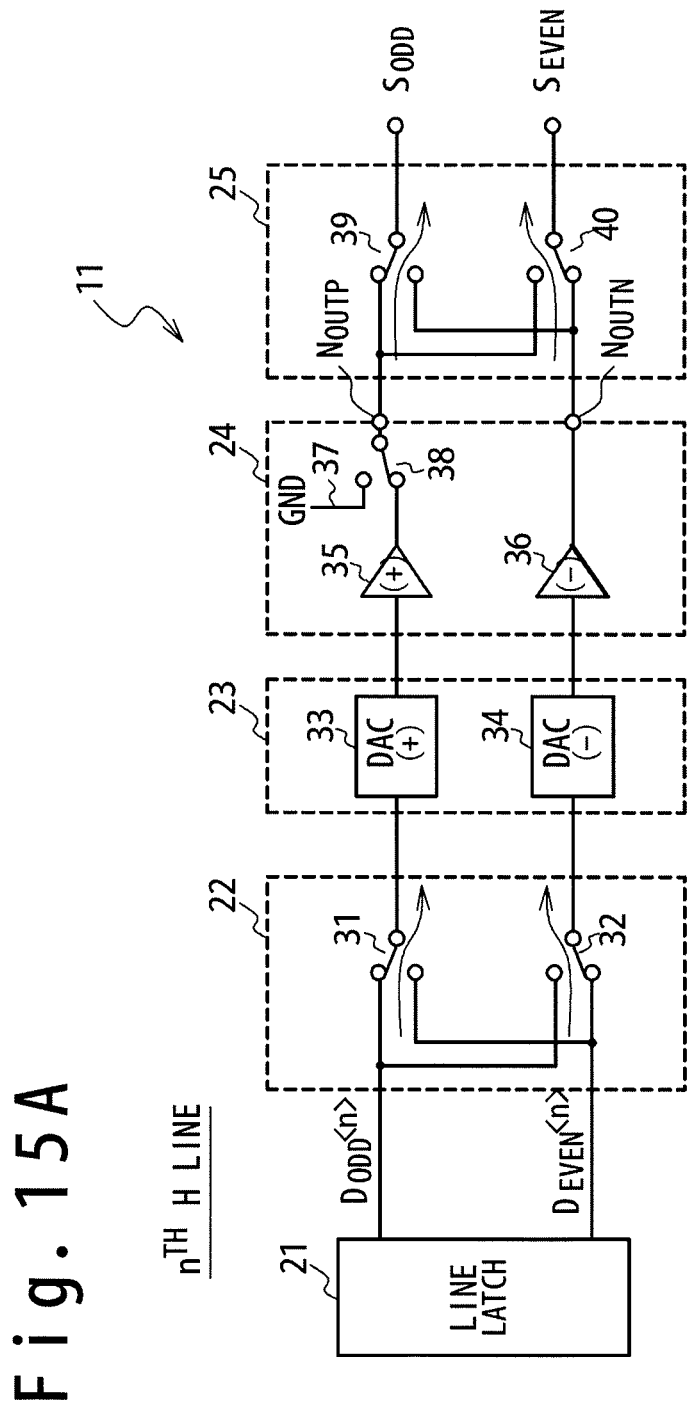

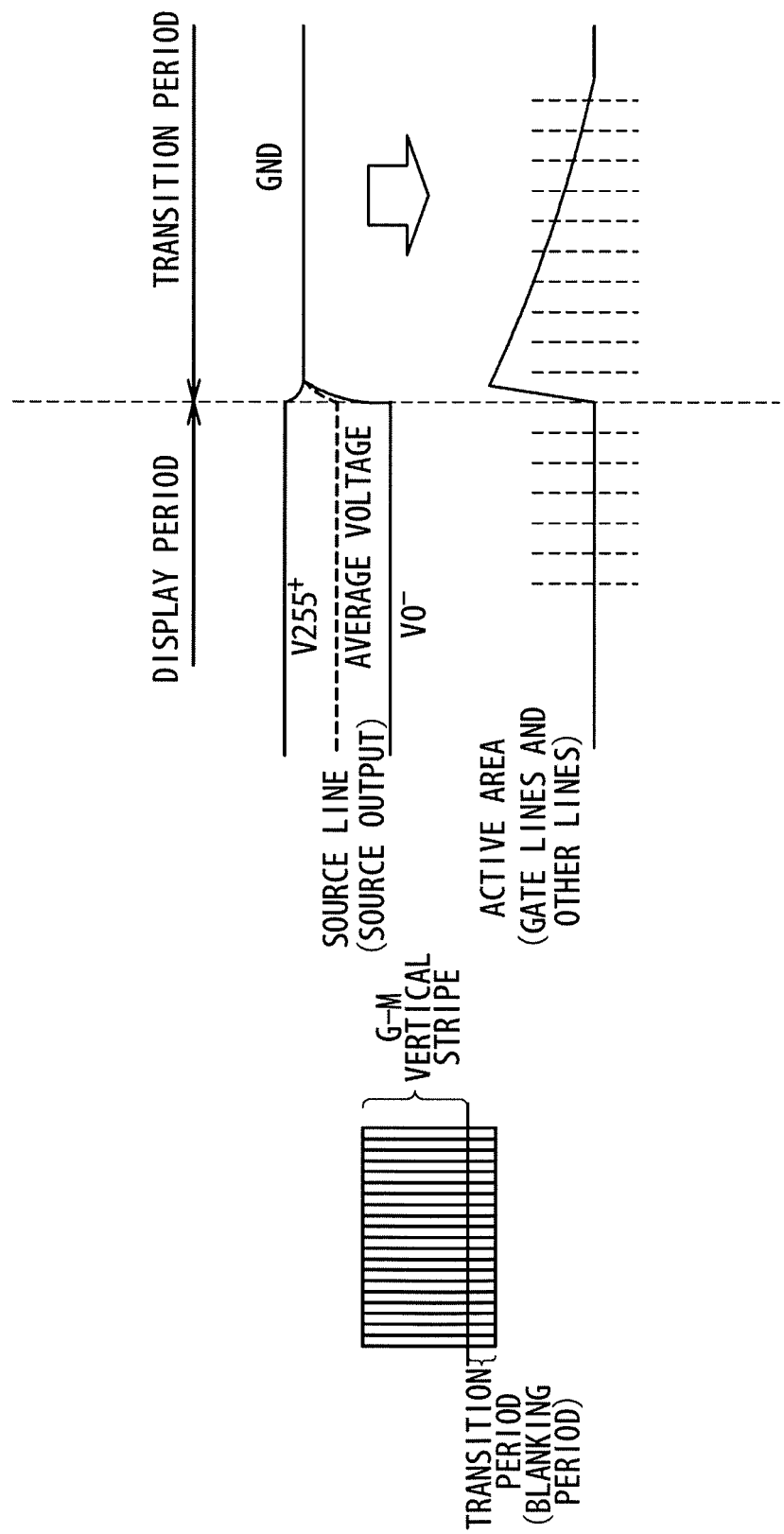

SEMICONDUCTOR DEVICE, DISPLAY DEVICE AND METHOD OF OPERATING THE SAME

CROSS REFERENCE

This application claims priority to Japanese Patent Application No. 2017-100041, filed on May 19, 2017, the disclosure of which is incorporated herein by reference in its entirety.

TECHNICAL FIELD

The present disclosure relates to a semiconductor device, display device and method of operating the same.

BACKGROUND

A display device incorporating a display panel configured to display an image and a touch panel adapted for touch sensing to detect user input provides a convenient user interface.

Capacitive sensing is one of touch sensing technologies. Some capacitive sensing technologies may be based on self-capacitance (also referred to as "absolute capacitance") sensing and/or mutual capacitance (also referred to as "transcapacitance") sensing. The self-capacitance sensing involves obtaining a sensing signal dependent on the self-capacitance of a sense electrode provided in the touch panel while the mutual capacitance sensing involves obtaining a sensing signal dependent on the mutual capacitance between a sense electrode and a drive electrode. Capacitive touch sensing is disclosed in Japanese Patent Application Publication No. 2015-141556.

A display panel may incorporate electrodes used for touch sensing, which may include sense electrodes and/or drive electrodes. For example, a liquid crystal display panel of this type may include common electrodes arrayed in rows and columns, and the common electrodes may also be used as sense electrodes or drive electrodes in touch sensing. Use of this type of display panel effectively reduces the volume of the entire display device, and may be suitable for application to mobile terminals.

Touch sensing may be performed in a blanking period during which image displaying is stopped. For example, after completion of a display period during which respective pixel circuits are driven in response to display data, the source lines are set to a predetermined potential, most typically, to the circuit ground level, to stabilize the electric state of the display panel, and then touch sensing is performed on the basis of sensing signals obtained from the sense electrodes.

Such touch sensing may suffer from noise applied to the sense electrodes. The operation to drive the source lines to the predetermined potential after the completion of the display period may cause changes in the potentials of conductors provided near the source lines, such as gate lines, in the active area. The changes in the potentials of the conductors may generate noise applied to the sense electrodes. Touch sensing may be performed after the noise is sufficiently attenuated to achieve precise touch sensing.

SUMMARY

In one embodiment, a semiconductor device includes source output circuitry, and touch sensing circuitry configured to perform touch sensing on a display panel in a touch sensing period after a display period. The source output circuitry is configured to, in a last horizontal sync period of the display period, drive a first source line of a plurality of source lines with a drive voltage having a first polarity based on first display data, and drive a second source line of the plurality of source lines with a drive voltage having a second polarity different from the first polarity based on second display data. The source output circuitry is configured to output a first dummy pulse having the first polarity in a transition period between the display period and the touch sensing period, the first dummy pulse having a voltage level depending on the second display data.

In another embodiment, a display device includes a display panel comprising a plurality of source lines, source output circuitry, and touch sensing circuitry configured to perform touch sensing on the display panel in a touch sensing period after a display period. The source output circuitry is configured to, in a last horizontal sync period of the display period, drive a first source line of the plurality of source lines with a drive voltage having a first polarity based on first display data and drive a second source line of the plurality of source lines with a drive voltage having a second polarity different from the first polarity based on second display data. The source output circuitry is configured to drive the first source line with a first dummy pulse having the first polarity in a transition period between the display period and the touch sensing period, the first dummy pulse having a voltage level depending on the second display data.

In another embodiment, a method of operating a display device includes supplying a first drive voltage having a first polarity to a first source line of a display panel of the display device in a final horizontal sync period in a display period, the first drive voltage having a voltage level specified first display data, and supplying a second drive voltage having a second polarity different from the first polarity to a second source line of the display panel in the final horizontal sync period, the second drive voltage having a voltage level specified second display data. The method further comprises outputting a first dummy pulse having the first polarity to the first source line in a transition period following the display period, the first dummy pulse having a voltage level based on the second display data, and driving the source lines to a predetermined potential after the in the transition period. Additionally, the method comprises performing touch sensing in a touch sensing period following the transition period.

BRIEF DESCRIPTION OF THE DRAWINGS

FIG. 5 illustrates column inversion drive according to one or more embodiments;

FIG. 11A illustrates an operation of source output circuitry according to one or more embodiments;

FIG. 12 illustrates one example of variations in voltages of respective source lines and an average voltage of the same in a display period and a transition period according to one or more embodiments;

FIG. 14 is a table of register values and display data according to one or more embodiments;

FIG. 15A illustrates an operation of source output circuitry according to one or more embodiments;

FIG. 16A is a timing chart according to one or more embodiments;

DETAILED DESCRIPTION

Figure 1A:
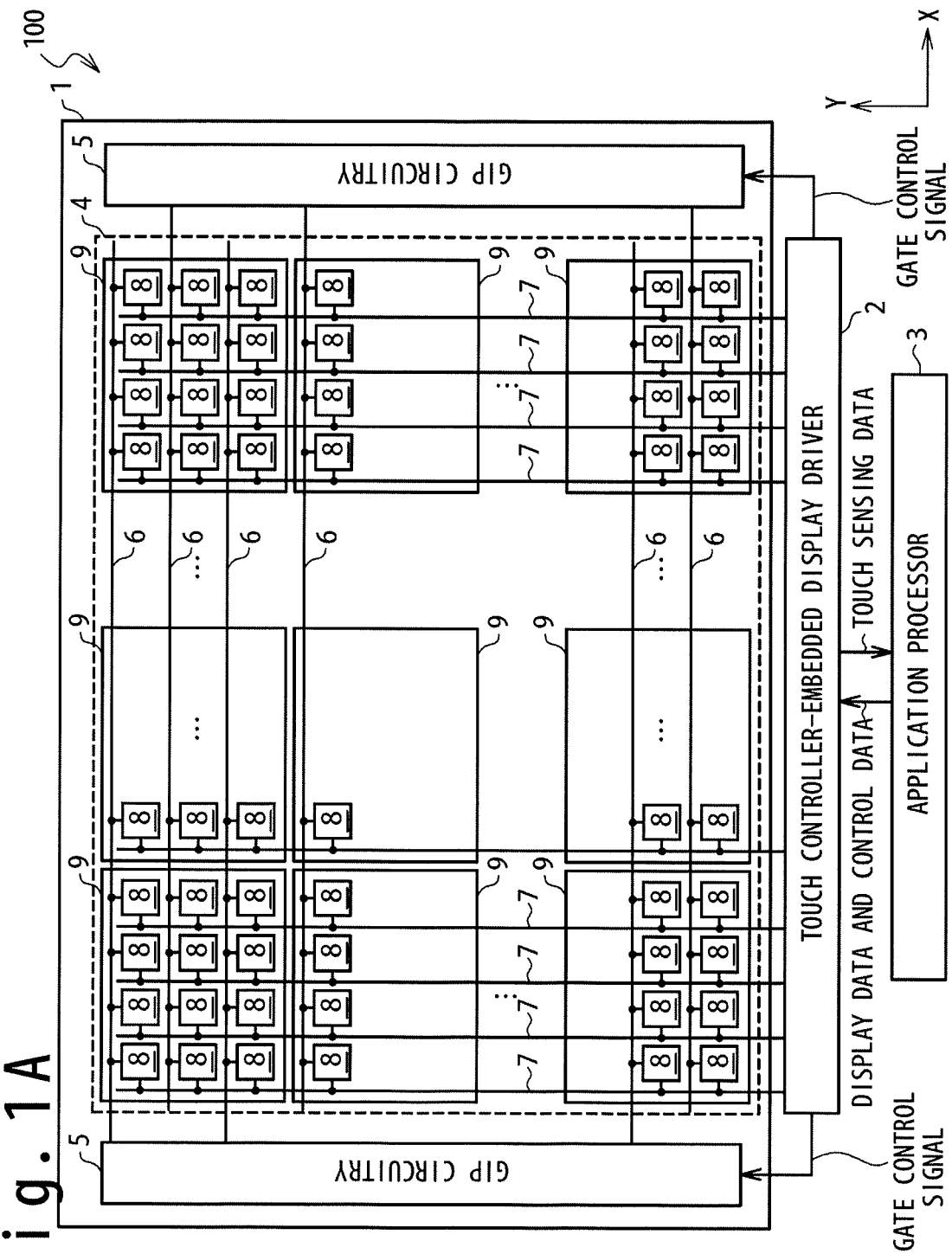
FIG. 1A is a schematic block diagram of a display device according to one or more embodiments.

Embodiments will be described below with reference to the attached drawings. It should be noted that same or corresponding components may be denoted by same or corresponding reference numerals in the following disclosure.

FIG. 1A is a block diagram schematically illustrating a display device 100 according to one or more embodiments. The display device 100 may include a liquid crystal display panel 1 and a touch controller-embedded display driver 2. The display device 100 may be configured to receive display data from an application processor 3 and display an image corresponding to the received display data on the liquid crystal display panel 1. The display device 100 may be configured to perform touch sensing of user input such as a position at which a conductor, such as a human finger and/or a stylus, is in contact with the liquid crystal display panel 1.

The liquid crystal display panel 1 may include an active area 4 and gate-in-panel (GIP) circuitries 5. In one embodiment, provided in the active area 4 are a plurality of gate lines 6, a plurality of source lines 7, a plurality of pixel circuits 8 and a plurality of common electrodes 9. The pixel circuits 8 may be arrayed in rows and columns, each being positioned at an intersection of a corresponding gate line 6 and source line 7, and the common electrodes 9 may also be arrayed in rows and columns. In one embodiment, each pixel circuit 8 may include a selection transistor, a pixel electrode and a hold capacitor. A drive voltage may be applied between the pixel electrode of each pixel circuit 8 and the corresponding common electrode 9. The orientation of liquid crystal filled between the pixel electrode and the common electrode 9 may be controlled by the electric field generated between the pixel electrode and the common electrode 9.

Figure 1B:
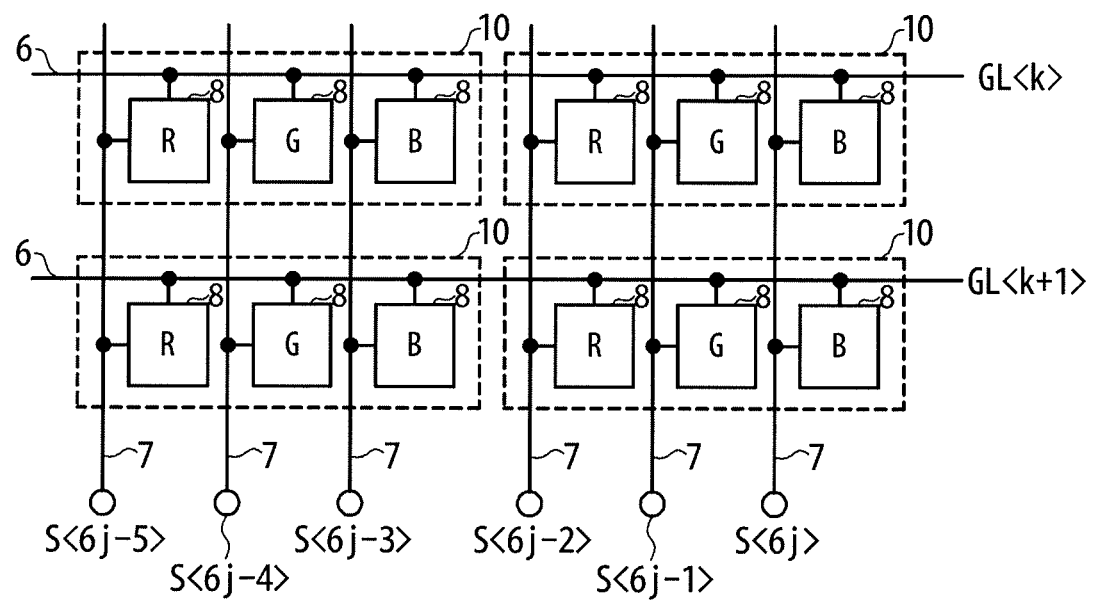
FIG. 1B schematically illustrates pixels according to one or more embodiments.

FIG. 1B schematically illustrates pixels 10 of the liquid crystal display panel 1 according to one or more embodiments. Each pixel 10 may include three pixel circuits 8 which display red (R), green (G) and blue (B), respectively. The pixel circuits 8 displaying red, green and blue are used as R, G and B subpixels, respectively. In one embodiment, each source line 7 is connected to pixel circuits 8 displaying the same color. Source lines 7 connected to the pixel circuits 8 displaying red, those connected to the pixel circuits 8 displaying green, and those connected to the pixel circuits 8 displaying blue may be alternatingly arranged.

Pixel circuits 8 connected to the same gate line 6 may be collectively referred to as "horizontal line". The pixel circuits 8 may be arranged to form a plurality of horizontal lines on the liquid crystal display panel 1.

Referring back to FIG. 1A, in one embodiment, the GIP circuitries 5 operate as gate driver circuitries which drive the gate lines 6 in response to gate control signals received from the touch controller-embedded display driver 2. In one embodiment, a pair of GIP circuitries 5 is disposed on the left and right of the active area 4. The GIP circuitries 5 may be integrated in the liquid crystal display panel 1 with an SOG (system on glass) technique.

In one embodiment, the common electrodes 9 arrayed in rows and columns in the active area 4 are used as sense electrodes in touch sensing. When self-capacitance touch sensing is performed, the self-capacitances of the respective common electrodes 9 are detected. In one embodiment where mutual capacitance touch sensing is performed, drive electrodes (not illustrated) are integrated in the liquid crystal display panel 1, and the mutual capacitances between the common electrodes 9 and the drive electrodes are detected.

In one embodiment, the touch controller-embedded display driver 2 is a semiconductor device which operates as follows: First, the touch controller-embedded display driver 2 has source outputs connected to the source lines 7 of the liquid crystal display panel 1 and drives the source lines 7 in response to display data received from the application processor 3. Second, the touch controller-embedded display driver 2 supplies gate control signals to the GIP circuitries 5 in response to control data received from the application processor 3 to control the GIP circuitries 5.

The touch controller-embedded display driver 2 may operate to achieve touch sensing. In one or more embodiments, the touch controller-embedded display driver 2 detects the capacitances of the respective common electrodes 9 of the liquid crystal display panel 1 and senses the position at which a conductor is in contact with the liquid crystal display panel 1, on the basis of the detected capacitances of the respective common electrodes 9. When self-capacitance touch sensing is performed, the touch controller-embedded display driver 2 may detect the self-capacitances of the common electrodes 9, and sense the position at which the conductor is in contact with or in close proximity to the liquid crystal display panel 1, on the basis of the detected self-capacitances. When mutual capacitance touch sensing is performed, the touch controller-embedded display driver 2 may detect the mutual capacitances between the drive electrodes and the common electrodes 9, and sense the position at which the conductor is in contact with the liquid crystal display panel 1, on the basis of the detected mutual capacitances. The touch controller-embedded display driver 2 may generate touch sensing data indicative of the position at which the conductor is in contact with the liquid crystal display panel 1 and transmit the generated touch sensing data to the application processor 3.

Figure 2:
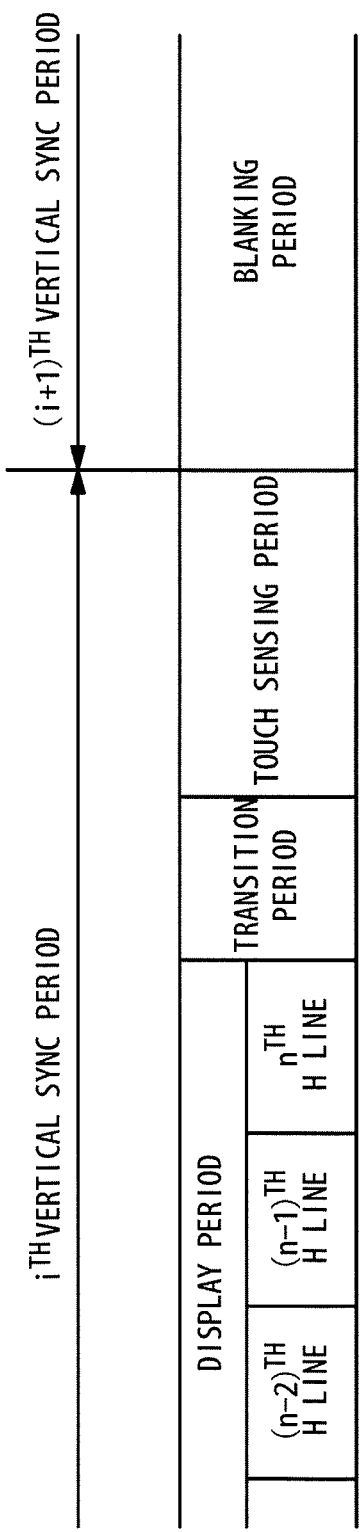
FIG. 2 is a timing chart of an operation of a display device according to one or more embodiments.

FIG. 2 is a timing chart illustrating one example of the operation of the display device 100 illustrated in FIG. 1A. In one embodiment, each vertical sync period, which may be also referred to as frame period, includes a display period, a transition period and a touch sensing period. In the display period, the respective pixel circuits 8 are driven in response to display data, in one embodiment. In the transition period, the respective source lines 7 are driven to a predetermined potential, in one embodiment, to the circuit ground level, to stabilize the electrical state of the liquid crystal display panel 1. In the touch sensing period, touch sensing may be performed on the basis of the capacitances of the common electrodes 9. Although FIG. 2 illustrates the operation of the display device 100 with an assumption that the touch sensing period is disposed at the end of each vertical sync period, several to several tens of touch sensing periods may be provided in each vertical sync period (about 16 ms for a refresh rate of 60 Hz) in an actual implementation.

In one embodiment, there are two types of "polarity" with respect to the drive voltages supplied to the respective pixel circuits 8 in the display period. The "polarity" of a drive voltage may be defined using the voltage on the common electrode 9, which is referred to as "common level $V_{COM}$", as the reference. A "positive" drive voltage has a voltage level higher than the common level $V_{COM}$ and a "negative" drive voltage has a voltage level lower than the common level $V_{COM}$. In one embodiment, the common level $V_{COM}$ is set to the circuit ground level GND of the touch controller-embedded display driver 2. In this case, the polarity of a drive voltage coincides with the polarity defined using the circuit ground level of the touch controller-embedded display driver 2 as the reference.

Figure 3:
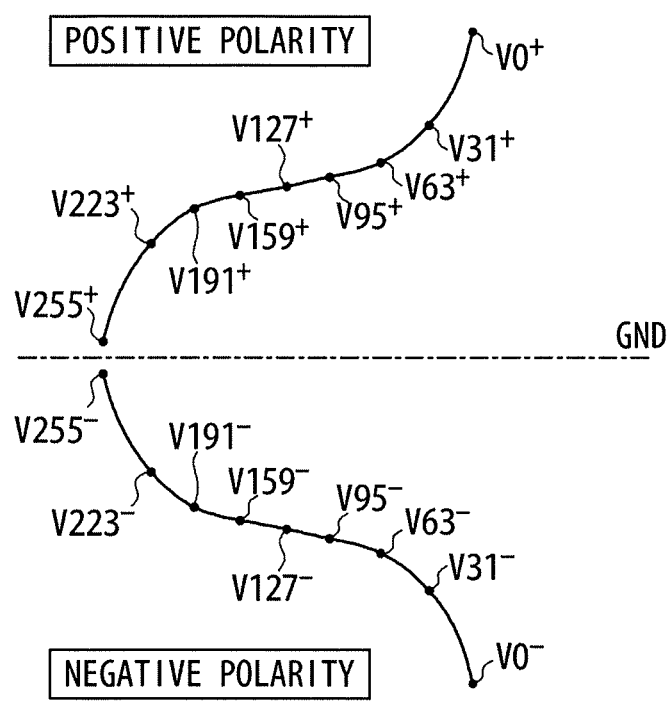
FIG. 3 illustrates correspondence of grayscale values according to one or more embodiments.

FIG. 3 illustrates one example of the correspondence of the grayscale values described in the display data with the "positive" drive voltage and the "negative" drive voltage according to one or more embodiments. Display data describe the grayscale value of each pixel circuit 8 as an 8-bit value. In FIG. 3, V0$^+$ to V255$^+$ denote the "positive" drive voltages corresponding to the grayscale values of "0" to "255", respectively, and V0$^-$ to V255$^-$ denote the "negative" drive voltages corresponding to the grayscale values of "0" to "255", respectively. The "positive" drive voltages V0$^+$ to V255$^+$ are higher than the circuit ground level GND and the voltage levels thereof are increased as the corresponding grayscale values are decreased. The "negative" drive voltages V0$^-$ to V255$^-$ are lower than the circuit ground level GND and the voltage levels thereof are decreased as the corresponding grayscale values are decreased.

In one embodiment, inversion drive is performed in the display period. Inversion drive is a driving scheme in which the polarities of drive voltages supplied to the respective pixel circuits 8 are inverted at a predetermined cycle period. In one embodiment, the polarities of drive voltages supplied to the respective pixel circuits 8 are inverted between vertical sync periods adjacent in the time domain. In this case, the cycle period at which the polarities of drive voltages supplied to the respective pixel circuits 8 are inverted is two vertical sync periods.

Figure 4:
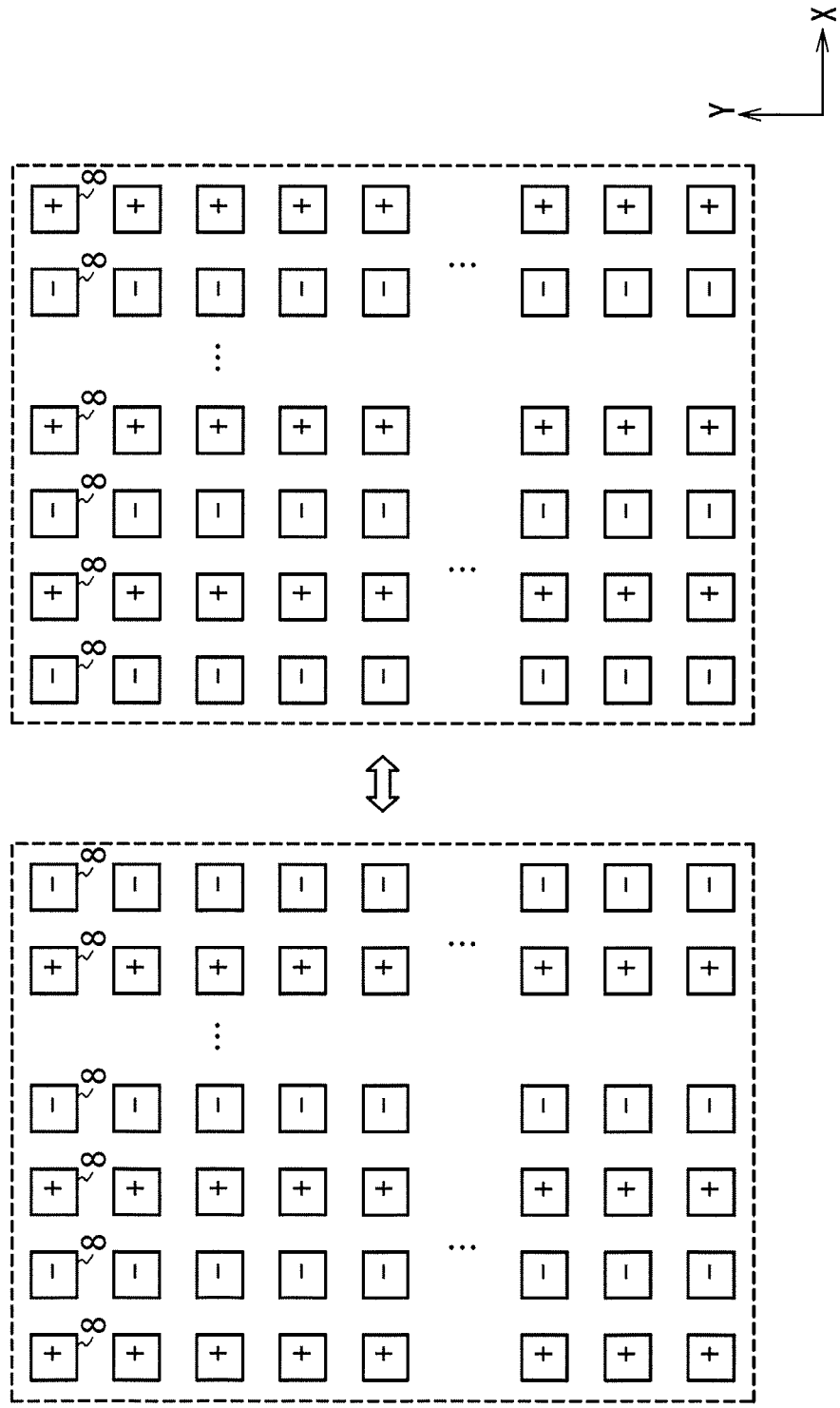
FIG. 4 illustrates polarity patterns of drive voltages according to one or more embodiments.

In one embodiment, the polarities of the drive voltages supplied to the respective pixel circuits 8 are determined so that the polarities of drive voltages supplied to pixel circuits 8 adjacent in the horizontal direction, which is the direction in which the gate lines 6 are extended, are opposite to each other. FIG. 4 illustrates one example of the polarity pattern of the drive voltages written into the respective pixel circuits 8 in each vertical sync period according to one or more embodiments. Illustrated in FIG. 4 are polarity patterns in the case when the liquid crystal display panel 1 is driven with a so-called "column inversion drive" scheme. The left part of FIG. 4 illustrates the polarity pattern in odd-numbered vertical sync periods, and the right part illustrates the polarity pattern in even-numbered vertical sync periods. In the column inversion drive, pixel circuits 8 positioned in the same column, that is, pixel circuits 8 connected to the same source line 7, are driven with drive voltages of the same polarity, and pixel circuits 8 positioned in adjacent columns, that is, pixel circuits 8 connected to adjacent source lines 7, are driven with drive voltages of opposite polarities.

Although FIG. 4 illustrates the column inversion drive, a different inversion drive scheme, such as dot inversion drive, may be used instead. In the dot inversion drive, pixel circuits 8 adjacent in the horizontal direction are driven with drive voltages of opposite polarities, and pixel circuits 8 adjacent in the vertical direction, which is the direction in which the source lines 7 are extended, are driven with drive voltages of opposite polarities.

In one or more embodiments, when inversion drive is performed, the polarities of the drive voltages supplied to the respective pixel circuits 8 may be selected so that the number of pixel circuits 8 driven with positive drive voltages is as close as to, ideally, equal to, that of pixel circuits 8 driven with negative drive voltages. This aims at making the average voltage of the source lines 7 over the entire liquid crystal display panel 1 as close to as the common level $V_{COM}$, in this embodiment, the circuit ground level.

Nevertheless, the average voltage of the source lines 7 of a horizontal sync period may be largely shifted from the circuit ground level, depending on the contents of the display data. FIG. 5 illustrates one example of the case when the average voltage of the source lines 7 of a horizontal sync period is largely shifted from the circuit ground level in column inversion drive according to one or more embodiments. In the example illustrated in FIG. 5, the positive drive voltage corresponding to the allowed maximum grayscale value is 0.2V and the positive drive voltage corresponding to the allowed minimum grayscale value is 5.2V. Similarly, the negative drive voltage corresponding to the allowed maximum grayscale value is −0.2V and the negative drive voltage corresponding to the allowed minimum grayscale value is −5.2V. In FIG. 5, the $(n-3)^{th}$ to $n^{th}$ horizontal lines, which are referred to as "$(n-3)^{TH}$ H LINES" to "$n^{TH}$ H LINES", are the horizontal lines in which the pixel circuits 8 are driven in the last four horizontal sync periods.

In the operation example illustrated in FIG. 5 according to one or more embodiments, the source lines 7 connected to the odd-numbered source outputs S<6j-5>, S<6j-3> and S<6j-1> are driven with a positive drive voltage corresponding to the allowed maximum grayscale value, that is, 0.2V, over the entire display period, and the source lines 7 connected to the odd-numbered source outputs S<6j-4>, S<6j-2> and S<6j> are driven with a negative drive voltage corresponding to the allowed maximum grayscale value, that is, −5.2V, over the entire display period. The image displayed by this operation is hereinafter referred to as "G-M vertical stripe image", since this image is observed by an observer of the liquid crystal display panel 1 as an image in which green vertical lines and magenta vertical lines are alternatingly arranged. In the operation example illustrated in FIG. 5, the average value of the drive voltages supplied to the source lines 7 is −2.5V in all the horizontal sync periods; this value would be appreciated as being largely shifted from the circuit ground level.

If the respective source lines 7 are driven to the circuit ground level in the transition period following the display period from the state in which the average voltage of the source lines 7 have been largely shifted from the circuit ground level at the end of the display period, this may increase noise applied to the common electrodes 9, which are used as the sense electrodes in touch sensing, and deteriorates the preciseness of the touch sensing. In detail, when the respective source lines 7 are driven to the circuit ground level in the transition period, the potentials of conductors positioned in the active area 4 such as the gate lines 6 may vary due to the capacitance coupling with the source lines 7. The variations in the potentials of the conductors positioned in the active area 4 may generate noise on the common electrodes 9.

Figure 6A:
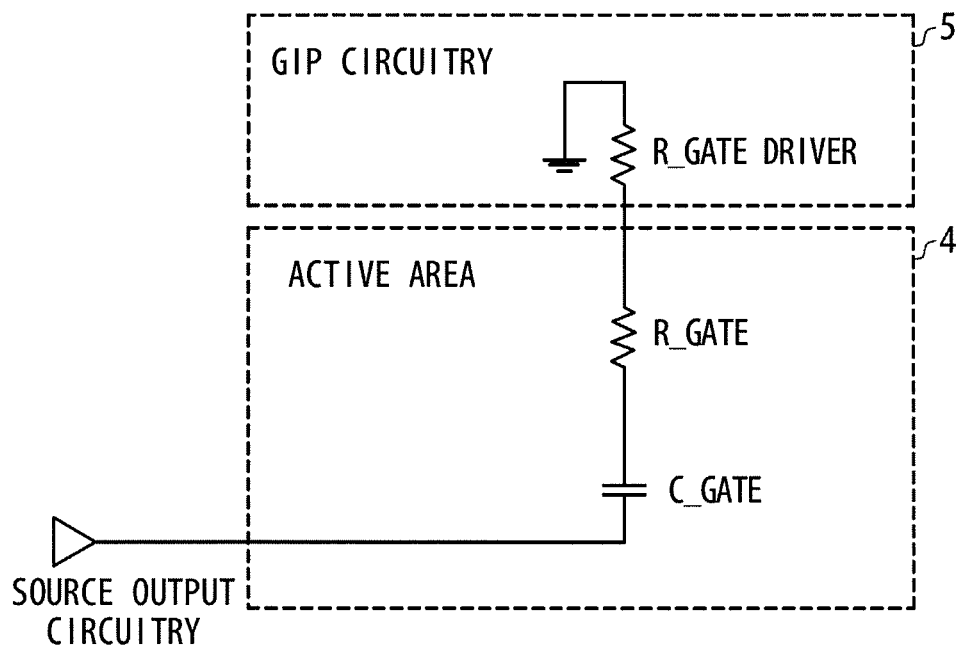
FIG. 6A illustrates a conductor positioned in an active area of a panel according to one or more embodiments.
Figure 6B:
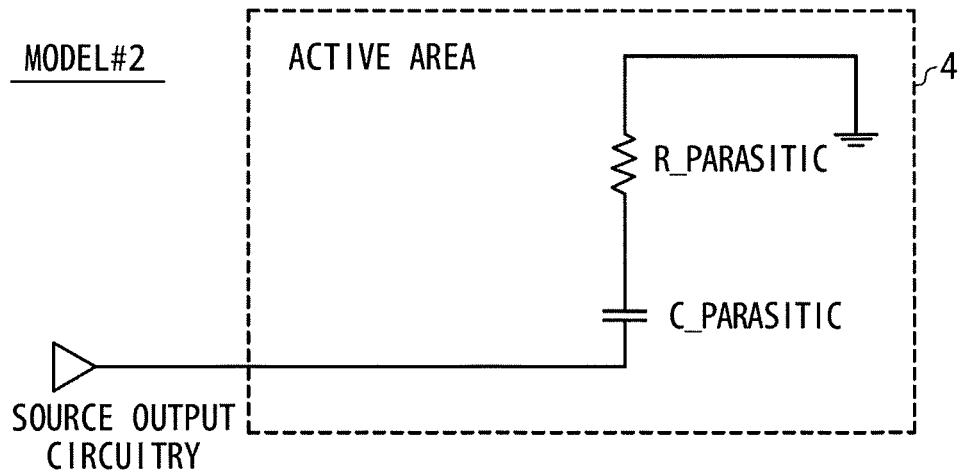
FIG. 6B illustrates a conductor positioned in an active area of a panel according to one or more embodiments.

The time constants of variations in the potentials of the conductors positioned in the active area 4 may be large. FIGS. 6A and 6B illustrates two models #1 and #2 of conductors positioned in the active area 4 according to one or more embodiments. Model #1 illustrates a model of potential variations in a gate line 6 positioned in the active area 4 and model #2 illustrates a model of potential variations in a different conductor positioned in the active area 4. Referring to FIG. 6A, in which "R_gate" denotes the resistance of the gate line 6 and "R_gate driver" denotes the output resistance of a GIP circuitry 5, the gate line 6 is capacitively coupled to the source line 7 and grounded via the output resistance of the GIP circuitry 5 in model #1. Referring to FIG. 6B, in model #2, the conductor positioned in the active area 4 is capacitively coupled to a source line 7 with the parasitic capacitance, and connected to the circuit ground via the parasitic resistance R_parasitic.

Figure 7:
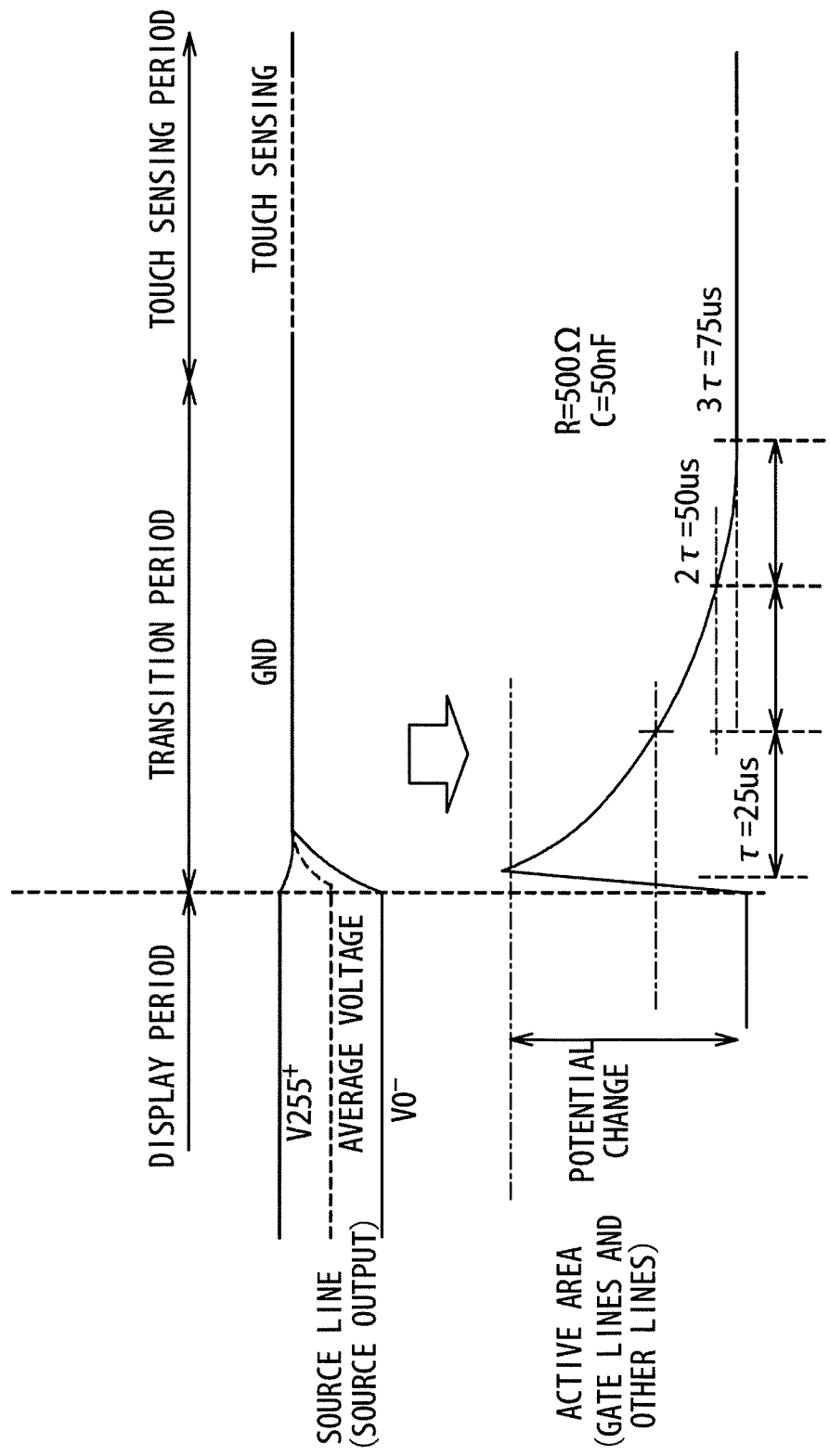
FIG. 7 illustrates one example of variations in potential of a conductor positioned in an active area of a panel according to one or more embodiments.

In these models, the time constant of potential variations of a conductor positioned in the active area 4 may be considerably large, and therefore the potential of the conductor may continue to vary for a considerable time after the display period is completed. FIG. 7 illustrates an example of the variations in the conductor, in which the source lines 7 are driven to the circuit ground level in the transition period following the display period according to one or more embodiments. FIG. 7 illustrates the case when a drive voltage $V255^+$, which is the positive drive voltage corresponding to a grayscale value of 255, is applied to pixel circuits 8 to be driven with a positive drive voltage in the last horizontal sync period of the display period, and a drive voltage $V0^-$, which is the negative voltage corresponding to a grayscale value of 0, is applied to pixel circuits 8 to be driven with the negative drive voltage.

In one example, the resistance of the conductor positioned in the active area 4 may be 500Ω and the coupling capacitance to the source lines 7 may be 50 nF. In this case, the time constant is 25 μs. This implies that the potential of the conductor positioned in the active area 4 continues to vary for about 75 μs.

Since variations in the potential of a conductor positioned in the active area 4 generate noise on the common electrodes 9, which are used as the sense electrodes in touch sensing, it is difficult to perform touch sensing while the potential of the conductor is largely varying. This implies that it takes a long time until the touch sensing is ready to be started after an image is displayed.

The type of image which causes a large shift in the average voltage of the liquid crystal display panel 1 from the circuit ground level depends on the type of inversion drive. In one or more embodiments, the issue of the large shift in the average voltage of the liquid crystal display panel 1 from the circuit ground level is not limited to the column inversion drive, because there exists an image causing a large shift in the average voltage of the liquid crystal display panel 1 from the circuit ground level for any types of inversion drive.

Presented in the following embodiments are technologies for attenuating the variations in the potential of a conductor positioned in the active area 4 in a short time and thereby shortening the duration of time until touch sensing is ready to be started after an image is displayed.

Figure 8:
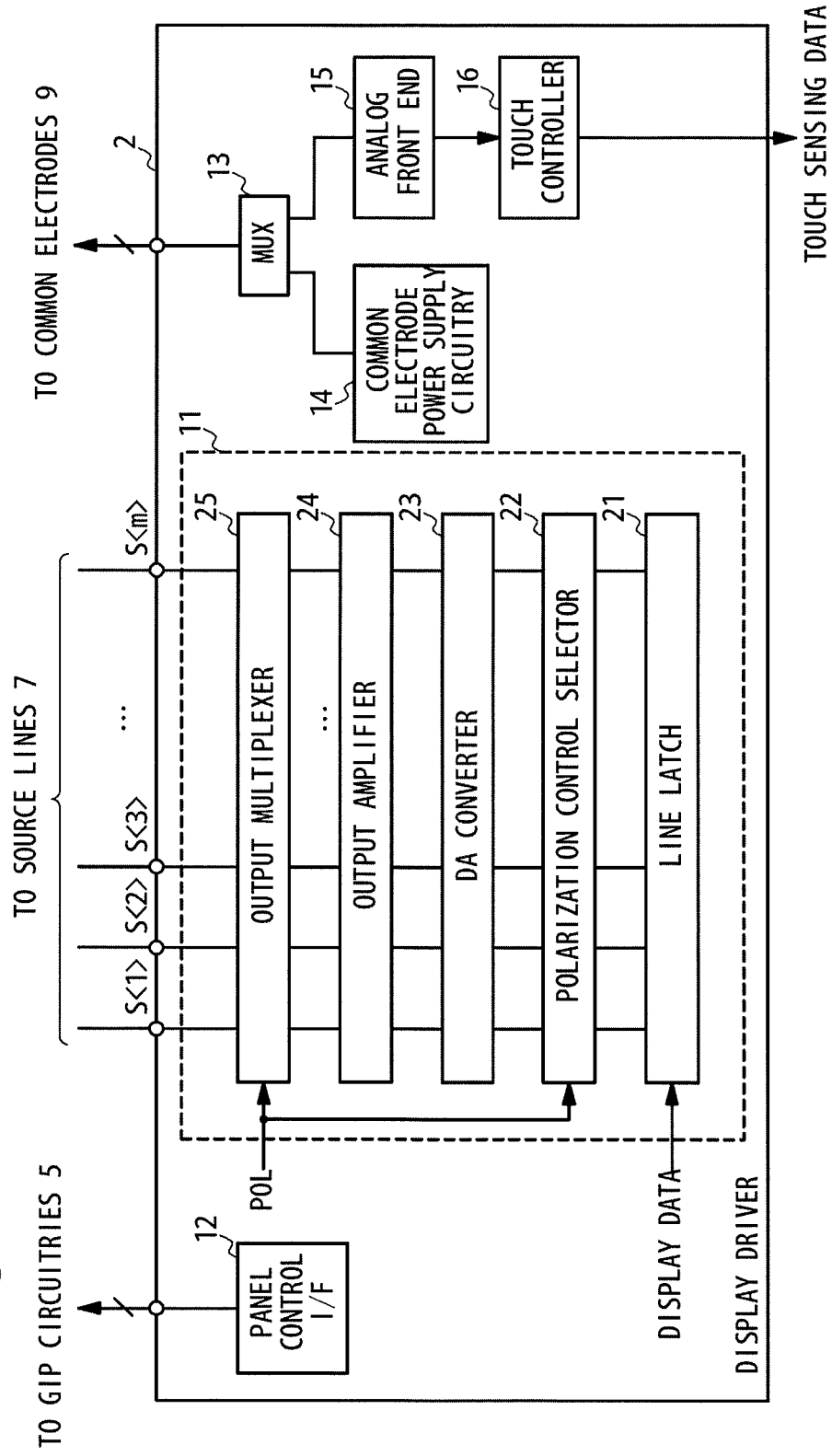
FIG. 8 is a block diagram of a touch controller-embedded display driver according to one or more embodiments.

FIG. 8 is a block diagram illustrating the configuration of a touch controller-embedded display driver 2 in accordance with one or more embodiments. In the following, the touch controller-embedded display driver 2 is simply referred to as the "display driver 2" for simplicity.

The display driver 2 includes a source output circuitry 11, a panel control interface 12, a multiplexer 13, a common electrode power supply circuitry 14, an analog front end 15 and a touch controller 16.

The source output circuitry 11 drives the source lines 7 connected to source outputs S<1> to S<m> in response to display data supplied from the application processor 3. Details of the configuration and operation of the source output circuitry 11 will be described later.

The panel control interface 12 supplies gate control signals to the GIP circuitries 5 of the liquid crystal display panel 1.

The multiplexer 13 is connected to the common electrodes 9 of the liquid crystal display panel 1 and configured to connect the common electrodes 9 to the common electrode power supply circuitry 14 or the analog front end 15. In detail, the multiplexer 13 connects the common electrodes 9 to the common electrode power supply circuitry 14 in the display period and the transition period and to the analog front end 15 in the touch sensing period.

The common electrode power supply circuitry 14 is configured to maintain the common electrodes 9 to a desired common level $V_{COM}$. In this embodiment, the common level $V_{COM}$ is set to the circuit ground level of the display driver 2. The common electrode power supply circuitry 14 is connected to the common electrodes 9 in the display period and the transition period to maintain the common electrodes 9 at the circuit ground level.

The analog front end 15 and the touch controller 16 constitutes a touch sensing circuitry which performs touch sensing based on the sensing signals obtained from the common electrodes 9.

The analog front end 15 performs analog signal processing for touch sensing. Specifically, in the touch sensing period, the analog front end 15 obtains sensing signals from the respective common electrodes 9 and generates capacitance detection data by performing analog-digital conversion on the sensing signals. The capacitance detection data describe values which depend on the capacitances of the common electrodes 9. More specifically, the capacitance detection data are generated as data indicative of the self-capacitances of the respective common electrodes 9 when self-capacitance touch sensing is performed. When mutual capacitance touch sensing is performed, on the other hand, the capacitance detection data are generated as data indicative of the mutual capacitances between the common electrodes 9 and the corresponding drive electrodes. The analog front end 15 may include a drive circuitry which drives the drive electrodes, when mutual capacitance touch sensing is performed.

The touch controller 16 receives the capacitance detection data from the analog front end 15, performs touch sensing calculation on the received capacitance detection data, and generates touch sensing data indicative of the touch sensing result obtained by the touch sensing calculation. The touch sensing result may include the position at which a conductor is in contact with the liquid crystal display panel 1. The touch sensing data thus generated are transmitted to the application processor 3.

In the following, a description is given of the configuration of the source output circuitry 11. The source output circuitry 11 includes a line latch 21, a polarity control selector circuitry 22, a DA converter circuitry 23, an output amplifier circuitry 24 and an output multiplexer circuitry 25.

The line latch 21 latches display data and stores therein the display data. In a horizontal sync period in which pixel circuits 8 of a certain horizontal line are driven, display data describing the grayscale values of the pixel circuits 8 of the horizontal line are stored in the line latch 21. The line latch 21 supplies the display data stored therein to the DA converter circuitry 23 via the polarity control selector circuitry 22.

The polarity control selector circuitry 22 switches connections between the outputs of the line latch 21 and the inputs of the DA converter circuitries 23 in response to a polarity signal POL. The polarity signal POL specifies the polarities of drive voltages supplied to the respective pixel circuits 8.

The DA converter circuitry 23 generates grayscale voltages associated with the respective source lines 7 by performing digital-analog conversion on the display data received from the line latch 21.

The output amplifier circuitry 24 receives the grayscale voltages associated with the respective source lines 7 from the DA converter circuitry 23 and generates drive voltages corresponding to the received grayscale voltages. In this embodiment, the output amplifier circuitry 24 performs impedance conversion on the received grayscale voltages to generate drive voltages having the same voltage levels as the received grayscale voltages.

The output multiplexer circuitry 25 switches connections between the outputs of the output amplifier circuitry 24 and the source outputs S<1> to S<m> in response to the polarity signal POL.

Figure 9:
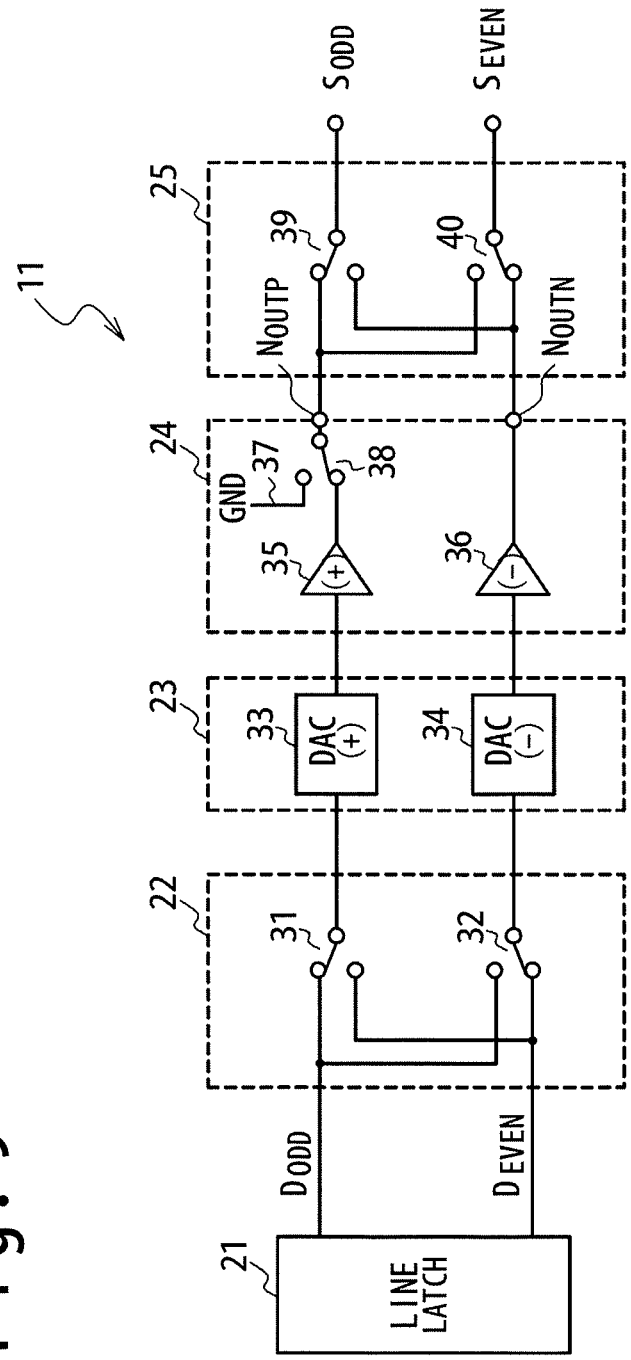
FIG. 9 is a circuit diagram illustrating a section associated with two source outputs of source output circuitry according to one or more embodiments.

FIG. 9 is a circuit diagram illustrating the configuration of a circuit section accommodating two source outputs of the source output circuitry 11 according to one or more embodiments. In FIG. 9, an odd-numbered source output is denoted by the legend "$S_{ODD}$" and an even-numbered source output is denoted by the legend "$S_{EVEN}$". The polarity control selector circuitry 22 includes multiplexers 31 and 32. The DA converter circuitry 23 includes a positive-side DA converter 33 and a negative-side DA converter 34. The output amplifier circuitry 24 includes a positive-side amplifier 35, a negative-side amplifier 36, a circuit ground line 37 and a switch 38. The output multiplexer circuitry 25 includes switches 39 and 40.

The line latch 21 is configured to output a display data $D_{ODD}$ associated with the source line 7 connected to the source output $S_{ODD}$ and a display data $D_{EVEN}$ associated with the source line 7 connected to the source output $S_{EVEN}$.

The polarity control selector circuitry 22 supplies one of the display data $D_{ODD}$ and $D_{EVEN}$ to the positive-side DA converter 33 and the other to the negative-side DA converter 34, through the operations of the multiplexers 31 and 32.

The positive-side DA converter 33 and the negative-side DA converter 34 generate grayscale voltages corresponding to the display data $D_{ODD}$ and $D_{EVEN}$. In detail, the positive-side DA converter 33 generates a positive grayscale voltage by performing analog-digital conversion on the display data received from the polarity control selector circuitry 22, which is the display data $D_{ODD}$ or $D_{EVEN}$. The negative-side DA converter 34 generates a negative grayscale voltage by performing analog-digital conversion on the display data received from the polarity control selector circuitry 22, which is the display data $D_{EVEN}$ or $D_{ODD}$. As is the case with the drive voltages outputted to the source lines 7, the polarity of a grayscale voltage is defined by using the common level $V_{COM}$, which is the voltage on the common electrodes 9 in the display period, as the reference in this specification. A "positive" grayscale voltage has a voltage level higher than the common level $V_{COM}$, and a "negative" grayscale voltage has a voltage level lower than the common level $V_{COM}$. The positive grayscale voltage generated by the positive-side DA converter 33 is supplied to the positive-side amplifier 35, and the negative grayscale voltage generated by the negative-side DA converter 34 is supplied to the negative-side amplifier 36.

The positive-side amplifier 35 generates a drive voltage corresponding to the positive grayscale voltage received from the positive-side DA converter 33. In this embodiment, the positive-side amplifier 35 is configured as a voltage follower and outputs a drive voltage having the same voltage level as that of the grayscale voltage received from the positive-side DA converter 33. In other words, the polarity of the drive voltage outputted from the positive-side amplifier 35 is positive.

Similarly, the negative-side amplifier 36 generates a drive voltage corresponding to the negative grayscale voltage received from the negative-side DA converter 34. In this embodiment, the negative-side amplifier 36 is also configured as a voltage follower and outputs a drive voltage having the same voltage level as that of the grayscale voltage received from the negative-side DA converter 34. In other words, the polarity of the drive voltage outputted from the negative-side amplifier 36 is negative.

The switch 38 connects a selected one of the output of the positive-side amplifier 35 and the circuit ground line 37 to a positive-side output node $N_{OUTP}$. A negative-side output node $N_{OUTN}$ is connected to the output of the negative-side amplifier 36.

The switch 39 is configured to connect one of the positive-side output node $N_{OUTP}$ and the negative-side output node $N_{OUTN}$ to the source output $S_{ODD}$. Similarly, the switch 40 is configured to connect one of the positive-side output node $N_{OUTP}$ and the negative-side output node $N_{OUTN}$ to the source output $S_{EVEN}$.

Figure 10:
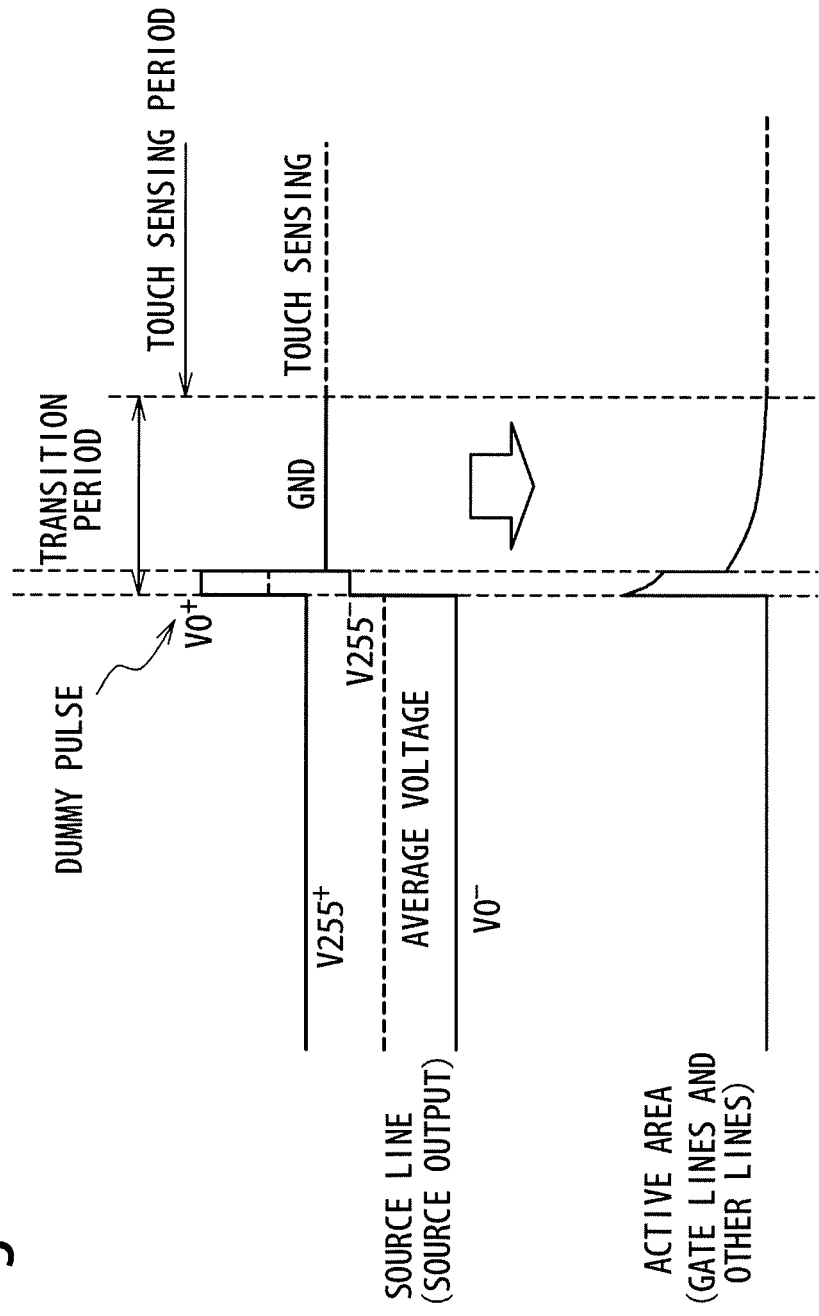
FIG. 10 is a timing chart illustrating an operation of a display driver according to one or more embodiments.

FIG. 10 is a timing chart illustrating the operation of the display driver 2 according to one or more embodiments. In this embodiment, the display driver 2 performs a dummy pulse output operation in the transition period, where the dummy pulse output operation involves outputting dummy pulses to the respective source lines 7 before driving the source lines 7 to the circuit ground level. The polarities of the dummy pulses supplied to the respective source lines 7 are the same as those of the drive voltages supplied to the corresponding source lines 7 in the last horizontal sync period of the display period. As is the case with the above-described drive voltages and grayscale voltages, the "polarity" of a dummy pulse referred to herein is defined by using as the reference the common level $V_{COM}$, which is the voltage of the common electrodes 9 in the display period. In this embodiment, in which the common level $V_{COM}$ is set to the circuit ground level of the display driver 2, the "polarity" of a dummy pulse coincides with the polarity defined by using the circuit ground level of the display driver 2 as the reference.

In detail, positive dummy pulses, that is, dummy pluses having voltage levels higher than the common level $V_{COM}$, are outputted to the source lines 7 to which positive drive voltages are supplied in the last horizontal sync period, and negative dummy pulses, that is, dummy pluses having voltage levels lower than the common level $V_{COM}$, are outputted to source lines 7 to which negative drive voltages are supplied in the last horizontal sync period.

The voltage levels of the dummy pulses outputted to the respective source lines 7 are determined to cancel the shift of the average voltage of the source lines 7 at the end of the display period. In detail, the voltage levels of the dummy pulses supplied to the source lines 7 which have been driven with positive drive voltages in the last horizontal sync period are determined in accordance with the display data associated with the source lines 7 which have been driven with negative drive voltages in the last horizontal sync period. The voltage levels of the dummy pulses supplied to the source lines 7 which have been driven with negative drive voltages in the last horizontal sync period are determined in accordance with the display data associated with the source lines 7 which have been driven with positive drive voltages in the last horizontal sync period.

After the dummy pulses are outputted to the respective source lines 7, the respective source lines 7 are driven to a predetermined voltage level, in this embodiment, the circuit ground level GND of the display driver 2.

Touch sensing is performed in the touch sensing period, which follows the transition period. In the touch sensing period, the analog front end 15 obtains sensing signals from the respective common electrodes 9 and generates capacitance detection data by performing analog-digital conversion on the sensing signals. The touch controller 16 receives the capacitance detection data from the analog front end 15, performs touch sensing calculation on the received capacitance detection data, and generates touch sensing data indicative of the touch sensing result obtained by the touch sensing calculation, which may include the position at which a conductor is in contact with the liquid crystal display panel 1. The touch sensing data thus generate are transmitted to the application processor 3.

With respect to the configuration of the source output circuitry 11 illustrated in FIG. 9, the dummy pulse outputted from the odd-numbered source output $S_{ODD}$ in the transition period is generated to have a voltage level depending on the display data which specifies the drive voltage outputted from the even-numbered source output $S_{EVEN}$ in the last horizontal sync period of the display period, and the dummy pulse outputted from the even-numbered source output $S_{even}$ in the transition period is generated to have a voltage level depending on the display data which specifies the drive voltage outputted from the even-numbered source output $S_{ODD}$ in the last horizontal sync period of the display period.

Figure 11B:
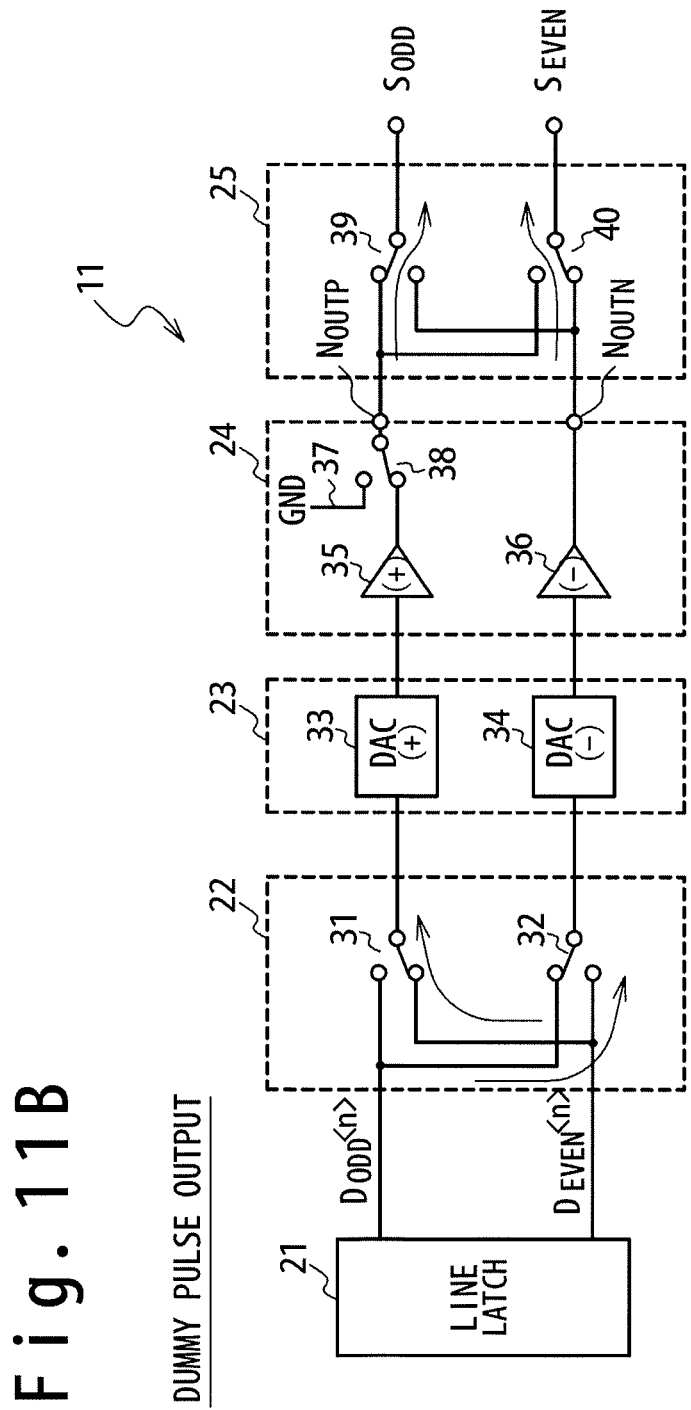
FIG. 11B illustrates an operation of source output circuitry according to one or more embodiments.
Figure 11C:
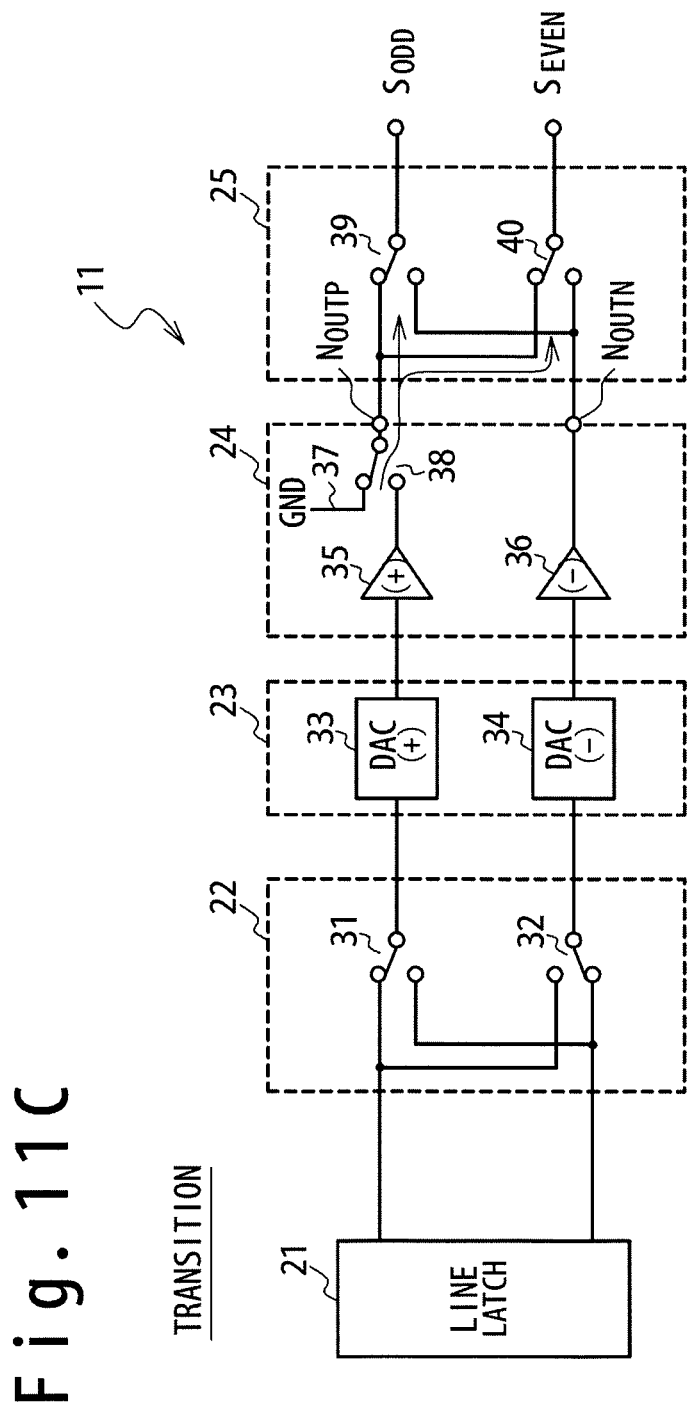
FIG. 11C illustrates an operation of source output circuitry according to one or more embodiments.

FIGS. 11A to 11C are circuit diagrams illustrating an exemplary operation of the source output circuitry 11 in the display period and the transition period according to one or more embodiments.

FIG. 11A illustrates the operation of the source output circuitry 11 in the last horizontal sync period of the display period. In the last horizontal sync period, the pixel circuits 8 in the $n^{th}$ horizontal line are driven. The following description is given under an assumption that the pixel circuit 8 connected to the odd-numbered source output $S_{ODD}$ and positioned in the $n^{th}$ horizontal line is driven with a positive drive voltage and the pixel circuit 8 connected to the odd-numbered source output $S_{even}$ and positioned in the $n^{th}$ horizontal line is driven with a negative drive voltage.

In the last horizontal sync period of the display period, the switches 39 and 40 of the output multiplexer circuitry 25 are set to connect the positive-side output node $N_{OUTP}$ to the source output $S_{ODD}$ and connect the negative-side output node $N_{OUTN}$ to the source output $S_{EVEN}$. Meanwhile, the switch 38 is set to connect the output of the positive-side amplifier 35 to the positive-side output node $N_{OUTP}$.

The source output circuitry 11 operate as follows: The line latch 21 outputs display data $D_{ODD}<n>$ specifying the drive voltage of the pixel circuit 8 connected to the source output $S_{ODD}$ and positioned in the $n^{th}$ horizontal line, and display data $D_{EVEN}<n>$ specifying the drive voltage of the pixel circuit 8 connected to the source output $S_{EVEN}$ and positioned in the $n^{th}$ horizontal line. The polarity control selector circuitry 22 supplies the display data $D_{ODD}<n>$ to the positive-side DA converter 33 and the display data $D_{EVEN}<n>$ to the negative-side DA converter 34. The positive-side DA converter 33 generates a positive grayscale voltage by performing digital-analog conversion on the display data $D_{ODD}<n>$, and the negative-side DA converter 34 generates a negative grayscale voltage by performing digital-analog conversion on the display data $D_{EVEN}<n>$. The positive-side amplifier 35 outputs a positive drive voltage corresponding to the positive grayscale voltage received from the positive-side DA converter 33 and the negative-side amplifier 36 outputs a negative drive voltage corresponding to the negative grayscale voltage received from the negative-side DA converter 34. The positive drive voltage outputted from the positive-side amplifier 35 is supplied to the source output $S_{ODD}$ to drive the pixel circuit 8 connected to the source output $S_{ODD}$ and positioned in the $n^{th}$ horizontal line with the positive drive voltage. The negative drive voltage outputted from the negative-side amplifier 36 is supplied to the source output $S_{EVEN}$ to drive the pixel circuit 8 connected to the source output $S_{EVEN}$ and positioned the $n^{th}$ horizontal line with the negative drive voltage.

FIG. 11B illustrates the operation of the source output circuitry 11 in the dummy pulse output operation performed subsequently to the last horizontal sync period. In the dummy pulse output operation, the line latch 21 continues to output the display data $D_{ODD}<n>$, which specifies the drive voltage of the pixel circuit 8 connected to the source output $S_a$) and positioned in the $n^{th}$ horizontal line, and the display data $D_{EVEN}<n>$, which specifies the drive voltage of the pixel circuit 8 connected to the source output $S_{EVEN}$ and positioned in the $n^{th}$ horizontal line.

Meanwhile, the polarity control selector circuitry 22 supplies the display data $D_{EVEN}<n>$ to the positive-side DA converter 33 and the display data $D_{ODD}<n>$ to the negative-side DA converter 34, in the dummy pulse output operation. In one or more embodiments, the display data $D_{EVEN}<n>$ specifies the drive voltage of a pixel circuit 8 which has been driven with a negative drive voltage in the last horizontal sync period, and the display data $D_{ODD}$<n> specifies the drive voltage of a pixel circuit 8 which has been driven with a positive drive voltage in the last horizontal sync period.

The positive-side DA converter 33 generates a positive grayscale voltage by performing analog-digital conversion on the display data $D_{EVEN}$<n>, and the negative-side DA converter 34 generates a negative grayscale voltage by performing analog-digital conversion on the display data $D_{ODD}$<n>.

The positive-side amplifier 35 outputs a positive drive voltage corresponding to the positive grayscale voltage received from the positive-side DA converter 33. The positive drive voltage outputted from the positive-side amplifier 35 is supplied to the source output $S_{ODD}$, and this allows driving the source line 7 connected to the source output $S_{ODD}$ with a positive dummy pulse in the dummy pulse output operation. In this operation, the voltage level of the dummy pulse supplied to the source line 7 connected to the source output $S_{ODD}$ is determined depending on the display data $D_{EVEN}$<n>.

The negative-side amplifier 36 outputs a negative drive voltage corresponding to the negative grayscale voltage received from the negative-side DA converter 34. The negative drive voltage outputted from the negative-side amplifier 36 is supplied to the source output $S_{EVEN}$, and this allows driving the source line 7 connected to the source output $S_{EVEN}$ with a negative dummy pulse in the dummy pulse output operation. In this operation, the voltage level of the dummy pulse supplied to the source line 7 connected to the source output $S_{EVEN}$ is determined depending on the display data $D_{ODD}$<n>.

FIG. 11C illustrates the operation of the source output circuitry 11 in a transition operation performed subsequently to the dummy pulse output operation. In the transition operation, the switch 38 is set to connect the circuit ground line 37 to the positive output node $N_{OUTP}$. Meanwhile, the switches 39 and 40 of the output multiplexer circuitry 25 are set to connect both of the source outputs $S_{ODD}$ and $S_{EVEN}$ to the positive-side output node $N_{OUTP}$. This allows driving both of the source lines 7 connected to the source outputs $S_{ODD}$ and $S_{EVEN}$ to the circuit ground level.

FIG. 12 illustrates one example of changes in the voltages of the respective source lines 7 and the average voltage of the source lines 7 in the display period and the transition period according to one or more embodiments. Column inversion drive is performed in the example illustrated in FIG. 12. In the example illustrated in FIG. 12, the positive drive voltage corresponding to the allowed maximum grayscale value is 0.2V and the positive drive voltage corresponding to the allowed minimum grayscale value is 5.2V. Similarly, the negative drive voltage corresponding to the allowed maximum grayscale value is -0.2V and the negative drive voltage corresponding to the allowed minimum grayscale value is -5.2V. In FIG. 12, the $(n-3)^{th}$ to $n^{th}$ horizontal lines, which are denoted by "$(n-3)^{TH}$ H LINE" to "$n^{TH}$ H LINE" in FIG. 12, are the horizontal lines of the pixel circuits 8 which are driven in the last four horizontal sync period.

In the operation example illustrated in FIG. 12, the source lines 7 connected to the odd-numbered source outputs S<6j-5>, S<6j-3> and S<6j-1> are driven with the positive drive voltage corresponding to the allowed maximum grayscale value (that is, 0.2V) and the source lines 7 connected to the even-numbered source outputs S<6j-4>, S<6j-2> and S<6j> are driven with the negative drive voltage corresponding to the allowed minimum grayscale value (that is, -5.2V). In this operation, the above-described "G-M vertical stripe image" is displayed. It would be understood that the average value of the drive voltages supplied to the source lines 7 is -2.5V in all the horizontal sync periods in the operation example illustrated in FIG. 12, and it would be appreciated that the average voltage of the source lines 7 at the end of the display period is largely shifted from the circuit ground level.

In the operation example illustrated in FIG. 12, in the dummy pulse output operation performed after the display period, the source lines 7 connected to the odd-numbered source outputs S<6j-5>, S<6j-3> and S<6j-1> are driven with dummy pulses corresponding to the display data specifying the drive voltages having been outputted to the even-numbered source outputs S<6j-4>, S<6j-2> and S<6j> in the last horizontal sync period, that is, the dummy pulses corresponding to the display data specifying the allowed minimum grayscale value. Meanwhile, the source lines 7 connected to the even-numbered source outputs S<6j-4>, S<6j-2> and S<6j> are driven with dummy pulses corresponding to the display data specifying the drive voltages having been outputted to the odd-numbered source outputs S<6j-5>, S<6j-3> and S<6j-1> in the last horizontal sync period, that is, the dummy pulses corresponding to the display data specifying the allowed maximum grayscale value.

This operation effectively cancels the shift in the average voltage of the source lines 7 at the end of the display period by outputting the dummy pulses to the respective source lines 7, and allows the potentials of conductors positioned in the active area 4 to rapidly become close to the potentials to which the conductors are finally settled when the source lines 7 are driven to the circuit ground level in the transition period. Accordingly, the operation in this embodiment allows attenuating changes in the potentials of conductors positioned in the active area 4 in a short time, and this effectively shortens the duration of time until touch sensing is ready to be started after an image is displayed.

Figure 13:
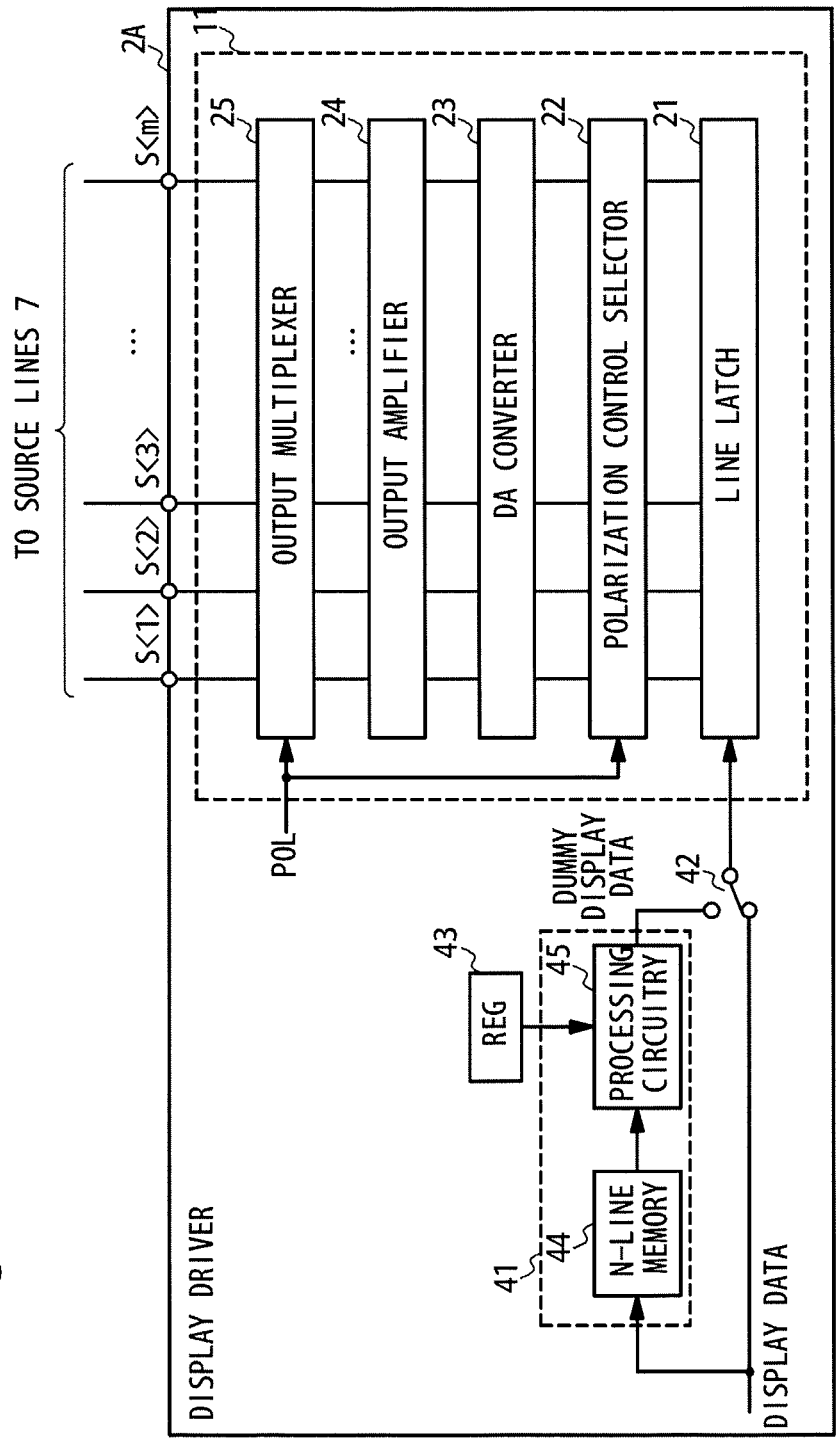
FIG. 13 is a block diagram of a display driver according to one or more embodiments.

FIG. 13 is a block diagram illustrating the configuration of a display driver 2A according to one or more embodiments. The display driver 2A is configured similarly to the display driver 2 according to one or more embodiments. One difference is that the display driver 2A of includes a dummy display data generator circuitry 41, a selector 42 and a register 43. In one embodiment, the panel control interface 12, the multiplexer 13, the common electrode power supply circuitry 14, the analog front end 15 and the touch controller 16 are not illustrated in FIG. 13 for simplicity of the drawing.

The dummy display data generator circuitry 41 generates dummy display data describing the grayscale values specifying the voltage levels of dummy pulses supplied to the respective source lines 7 in the dummy pulse output operation. The selector 42 supplies display data corresponding to an image to be displayed on the liquid crystal display panel 1 to the line latch 21 of the source output circuitry 11 in the display period, and also supplies dummy display data to the line latch 21 when a dummy pulse output operation is performed. The register 43 stores therein a register value to control the dummy display data generator circuitry 41.

In one embodiment, the dummy display data generator circuitry 41 includes an N-line memory 44 and a processing circuitry 45. The N-line memory 44 has a capacity enough to store display data associated with pixel circuits 8 of N horizontal lines, where N is an integer two or more. The processing circuitry 45 generates the dummy display data by processing the display data stored in the N-line memory 44. The dummy display data are transmitted to the line latch 21 immediately before the dummy pulse output operation is performed. In the dummy pulse output operation, dummy pulses having voltage levels specified by the grayscale values described in the dummy display data are supplied to the respective source lines 7.

In one embodiment, the dummy display data are generated on the basis of the display data in the last M horizontal sync periods in the display period, where M is an integer from one to N specified by the register value stored in the register 43. FIG. 14 is a table illustrating the relation between the register value stored in the register 43 and the display data on the basis of which the dummy display data are generated. In one embodiment, the dummy display data may be generated on the basis of the display data in the last (k+1) horizontal sync periods, when the register value stored in the register 43 is k.

The generation of the dummy display data on the basis of the display data of the last multiple horizontal sync periods in the display period, that is, the setting of M to an integer of two or more, effectively allows generating dummy pulses having more appropriate voltage levels. The variations in the potential of a conductor positioned in the active area 4 upon driving the source lines 7 to the circuit ground level in the transition period depend on not only the drive voltages supplied to the source lines 7 in the last horizontal sync period but also those supplied to the source lines 7 in previous horizontal sync periods. The configuration of the display driver 2A in this embodiment, which can generate the dummy display data on the basis of the display data in the last multiple horizontal sync periods of the display period, allows supplying dummy pulses of more appropriate voltage levels to the respective source lines 7.

In one or more embodiments, the dummy display data are generated on the basis of the display data in the last horizontal display period of the display period when M is one. In such an embodiment, the dummy pulses are generated similarly to the dummy pulse output operation.

Figure 15B:
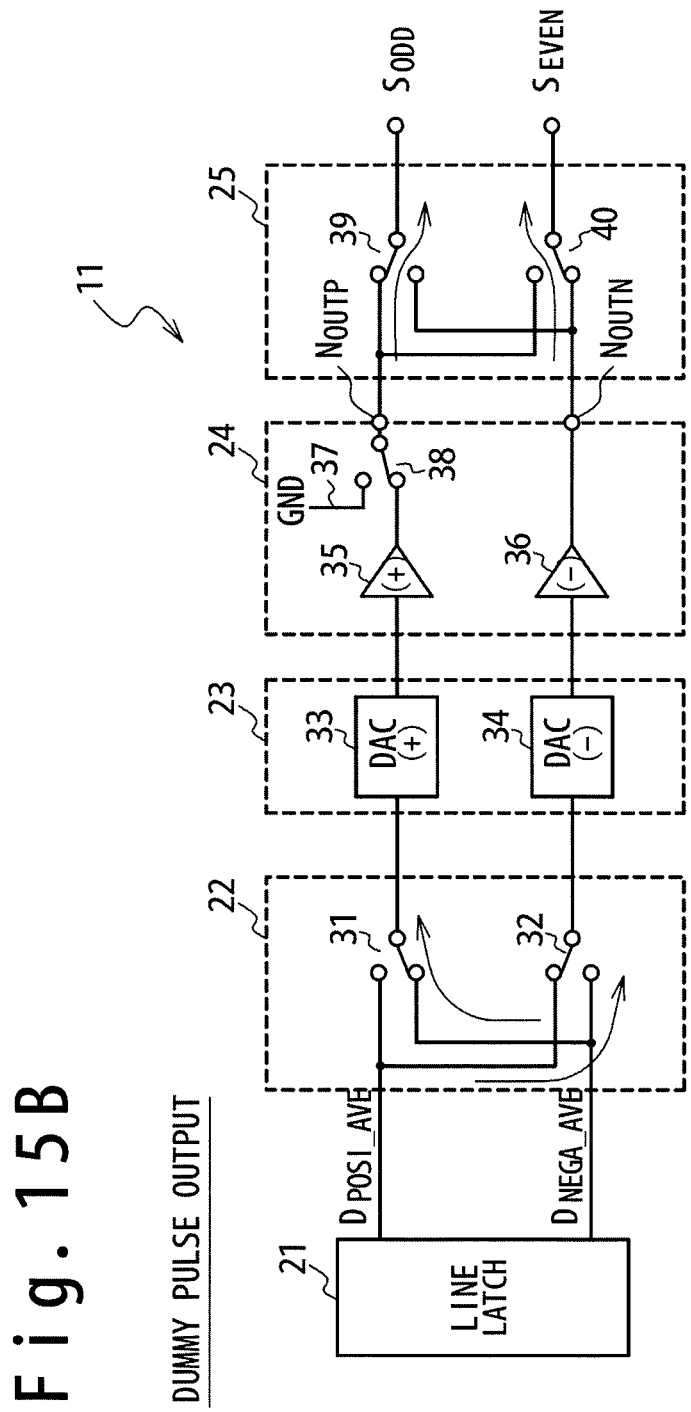
FIG. 15B illustrates an operation of source output circuitry according to one or more embodiments.
Figure 15C:
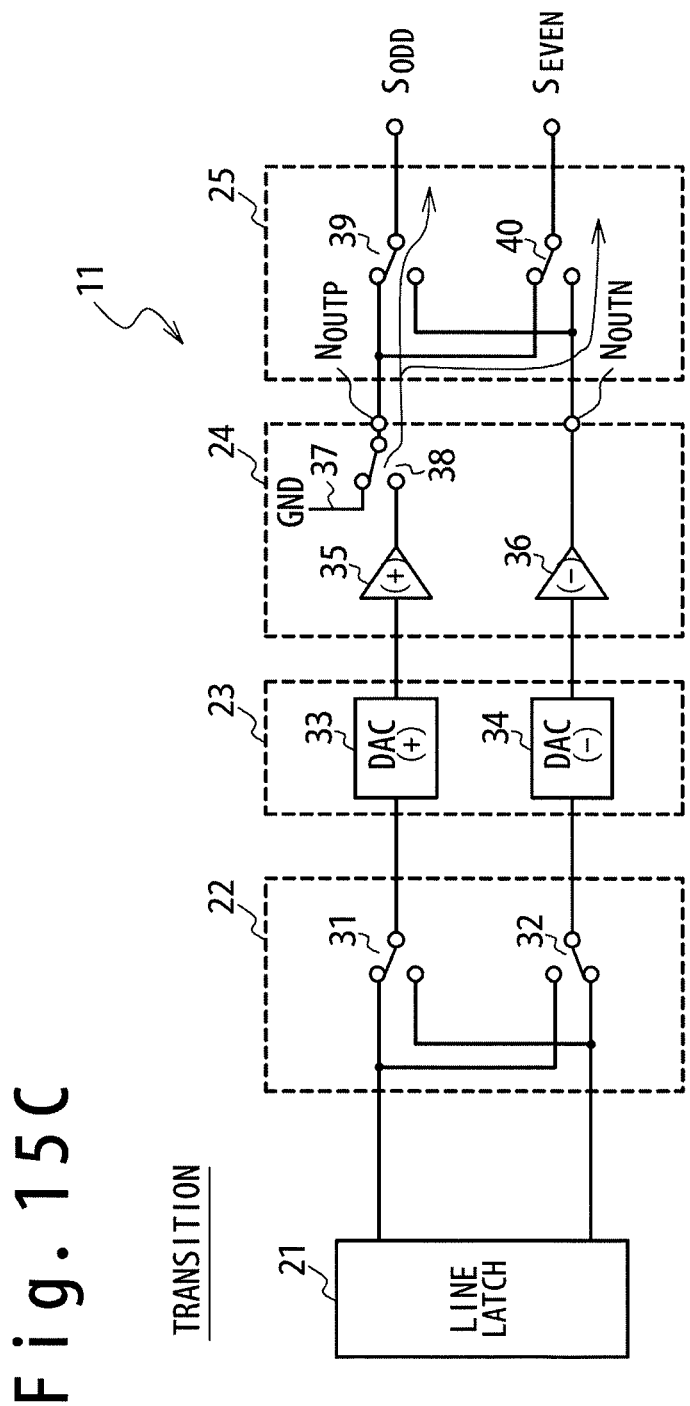
FIG. 15C illustrates an operation of source output circuitry according to one or more embodiments.

FIGS. 15A to 15C are circuit diagrams illustrating an exemplary operation of the source output circuitry 11 according to one or more embodiments.

FIG. 15A illustrates the operation of the source output circuitry 11 in the last horizontal sync period of the display period. In the last horizontal sync period, the pixel circuits 8 in the $n^{th}$ horizontal line are driven. In one embodiment, the pixel circuit 8 connected to the odd-numbered source output $S_{ODD}$ and positioned in the $n^{th}$ horizontal line is driven with a positive drive voltage, and the pixel circuit 8 connected to the even-numbered source output $S_{EVEN}$ and positioned in the $n^{th}$ horizontal line is driven with a negative drive voltage.

In one or more embodiments, in the last horizontal sync period, the switches 39 and 40 of the output multiplexer circuitry 25 are set to connect the positive-side output node $N_{OUTP}$ to the source output $S_{ODD}$ and connect the negative-side output node $N_{OUTN}$ to the source output $S_{EVEN}$. The switch 38 is set to connect the output of the positive-side amplifier 35 to the positive-side output node $N_{OUTP}$.

The source output circuitry 11 operate as follows: The line latch 21 outputs display data $D_{ODD}<n>$ specifying the drive voltage of the pixel circuit 8 connected to the source output $S_{ODD}$ and positioned in the $n^{th}$ horizontal line, and display data $D_{EVEN}<n>$ specifying the drive voltage of the pixel circuit 8 connected to the source output $S_{EVEN}$ and positioned in the $n^{th}$ horizontal line. The polarity control selector circuitry 22 supplies the display data $D_{ODD}<n>$ to the positive-side DA converter 33 and the display data $D_{EVEN}<n>$ to the negative-side DA converter 34. The positive-side DA converter 33 generates a positive grayscale voltage by performing digital-analog conversion on the display data $D_{ODD}<n>$, and the negative-side DA converter 34 generates a negative grayscale voltage by performing digital-analog conversion on the display data $D_{EVEN}<n>$. The positive-side amplifier 35 outputs a positive drive voltage corresponding to the positive grayscale voltage received from the positive-side DA converter 33 and the negative-side amplifier 36 outputs a negative drive voltage corresponding to the negative grayscale voltage received from the negative-side DA converter 34. The positive drive voltage outputted from the positive-side amplifier 35 is supplied to the source output $S_{ODD}$ to drive the pixel circuit 8 connected to the source output $S_{ODD}$ and positioned the $n^{th}$ horizontal line with the positive drive voltage. The negative drive voltage outputted from the negative-side amplifier 36 is supplied to the source output $S_{EVEN}$ to drive the pixel circuit 8 connected to the source output $S_{EVEN}$ and positioned the $n^{th}$ horizontal line with the negative drive voltage.

FIG. 15B illustrates the operation of the source output circuitry 11 in the dummy pulse output operation performed subsequently to the last horizontal sync period. The dummy display data generator circuitry 41 supplies the dummy display data to the line latch 21 immediately before the dummy pulse output operation is started and the line latch 21 outputs the dummy display data thus supplied in the dummy pulse output operation. The dummy display data associated with the source outputs $S_{ODD}$ and $S_{EVEN}$ are referred to as the dummy display data $D_{POSI\_AVE}$ and $D_{NEGA\_AVE}$, respectively, in FIG. 15B.

The polarity control selector circuitry 22 supplies the dummy display data $D_{NEGA\_AVE}$ to the positive-side DA converter 33 and supplies the dummy display data $D_{POSI\_AVE}$ to the negative-side DA converter 34. The positive-side DA converter 33 generates a positive grayscale voltage by performing digital-analog conversion on the dummy display data $D_{NEGA\_AVE}$, and the negative-side DA converter 34 generates a negative grayscale voltage by performing digital-analog conversion on the display data $D_{POSI\_AVE}$.

The positive-side amplifier 35 outputs a positive drive voltage corresponding to the positive grayscale voltage received from the positive-side DA converter 33. The positive drive voltage outputted from the positive-side amplifier 35 is supplied to the source output $S_{ODD}$, and this achieves driving the source line 7 connected to the source output $S_{ODD}$ with a positive dummy pulse in the dummy pulse output operation. The negative-side amplifier 36 outputs a negative drive voltage corresponding to the negative grayscale voltage received from the negative-side DA converter 34. The negative drive voltage outputted from the negative-side amplifier 36 is supplied to the source output $S_{EVEN}$, and this achieves driving the source line 7 connected to the source output $S_{EVEN}$ with a negative dummy pulse in the dummy pulse output operation.

In the above-described operation, the voltage level of the dummy pulse supplied to the source line 7 connected to the source output $S_{ODD}$ is specified by the dummy display data $D_{NEGA\_AVE}$, and the voltage level of the dummy pulse supplied to the source line 7 connected to the source output $S_{EVEN}$ is specified by the dummy display data $D_{POSI\_AVE}$. The dummy display data $D_{POSI\_AVE}$ and $D_{NEGA\_AVE}$ are calculated as described in the following. The following description is given with an assumption that a positive drive voltage is supplied to the source line 7 connected to the source output $S_{ODD}$ in the last horizontal sync period, and a negative drive voltage is supplied to the source line 7 connected to the source output $S_{EVEN}$ in the last horizontal sync period. In this case, a positive dummy pulse is supplied to the source line 7 connected to the source output $S_{ODD}$ and a negative dummy pulse is supplied to the source line 7 connected to the source output $S_{EVEN}$.

The dummy display data $D_{NEGA\_AVE}$ specifying the voltage level of the positive dummy pulse supplied to the source line 7 connected to the source output $S_{ODD}$ is generated on basis of the display data specifying the negative drive voltages, selected out of the display data specifying the drive voltages supplied to the source lines 7 connected to the source outputs $S_{ODD}$ and $S_{EVEN}$ in the last M horizontal sync periods. Similarly, the dummy display data $D_{POSI\_AVE}$ specifying the voltage level of the negative dummy pulse supplied to the source line 7 connected to the source output $S_{EVEN}$ is generated on basis of the display data specifying the positive drive voltages, selected out of the display data specifying the drive voltages supplied to the source lines 7 connected to the source outputs $S_{ODD}$ and $S_{EVEN}$ in the last M horizontal sync periods.

When column inversion drive is performed, for example, in all of the last M horizontal sync periods, positive drive voltages are continuingly supplied to the source line 7 connected to the source output $S_{ODD}$ and negative drive voltages are continuingly supplied to the source line 7 connected to the source output $S_{EVEN}$.

In this case, the dummy display data $D_{NEGA\_AVE}$, which specifies the voltage level of the positive dummy pulse supplied to the source line 7 connected to the source output $S_{ODD}$, is calculated on the basis of the display data specifying the drive voltages supplied to the source line 7 connected to the source output $S_{EVEN}$ in the last M horizontal sync periods. Most simply, the dummy display data $D_{NEGA\_AVE}$ may be calculated as the average value of the display data specifying the drive voltages supplied to the source line 7 connected to the source output $S_{EVEN}$ in the last M horizontal sync periods.

Meanwhile, the dummy display data $D_{POSI\_AVE}$, which specifies the voltage level of the negative dummy pulse supplied to the source line 7 connected to the source output $S_{EVEN}$, is calculated on the basis of the display data specifying the drive voltages supplied to the source line 7 connected to the source output $S_{ODD}$ in the last M horizontal sync periods. Most simply, the dummy display data $D_{POSI\_AVE}$ may be calculated as the average value of the display data specifying the drive voltages supplied to the source line 7 connected to the source output $S_{ODD}$ in the last M horizontal sync periods.

The dummy display data $D_{POSI\_AVE}$ and $D_{NEGA\_AVE}$ may be calculated with weighting of the display data on the basis of the horizontal sync periods associated with the respective display data. Discussed below is the case when column inversion drive is performed and the dummy display data $D_{NEGA\_AVE}$ is calculated from the display data specifying the drive voltages supplied to the source line 7 connected to the source output $S_{EVEN}$ in the last M horizontal sync periods. In one embodiment, the dummy display data $D_{NEGA\_AVE}$ may be calculated in accordance with the following expression (1a):

$$D_{NEGA\_AVE} = \left\{ \sum_{k=n-M-1}^{n} w_k \cdot D_{EVEN} <k> \right\} / M \quad (1a)$$

where $D_{EVEN}<n-(M-1)>$ to $D_{EVEN}<n>$ are the display data specifying the drive voltages supplied to the source line 7 connected to the source output $S_{EVEN}$ in the last M horizontal sync periods, and $w_k$ is a weighting factor.

When $w_k$ is one for any k from n−M−1 to n, the dummy display data $D_{NEGA\_AVE}$ is calculated as the average value of the display data specifying the drive voltages supplied to the source line 7 connected to the source output $S_{EVEN}$ in the last M horizontal sync periods.

Similarly, the dummy display data $D_{POSI\_AVE}$ may be calculated in accordance with expression (1b):

$$D_{POSI\_AVE} = \left\{ \sum_{k=n-M-1}^{n} w_k \cdot D_{ODD} <k> \right\} / M \quad (1b)$$

where $D_{ODD}<n-(M-1)>$ to $D_{ODD}<n>$ are the display data specifying the drive voltages supplied to the source line 7 connected to the source output $S_{ODD}$ in the last M horizontal sync periods. Also in this case, the dummy display data $D_{POSI\_AVE}$ is calculated as the average value of the display data specifying the drive voltages supplied to the source line 7 connected to the source output $S_{ODD}$ in the last M horizontal sync periods, when $w_k$ is one for any k from n−M−1 to n.

After the dummy pulse output operation, a transition operation is performed to drive the respective source lines 7 to the circuit ground level. FIG. 15C illustrates the operation of the source output circuitry 11 in the transition operation. In the transition operation, the switch 38 is set to connect the circuit ground line 37 to the positive output node $N_{OUTP}$. Meanwhile, the switches 39 and 40 of the output multiplexer circuitry 25 are set to connect both of the source outputs $S_{ODD}$ and $S_{EVEN}$ to the positive-side output node $N_{OUTP}$. This allows driving both of the source lines 7 connected to the source outputs $S_{ODD}$ and $S_{EVEN}$ to the circuit ground level.

Figure 16B:
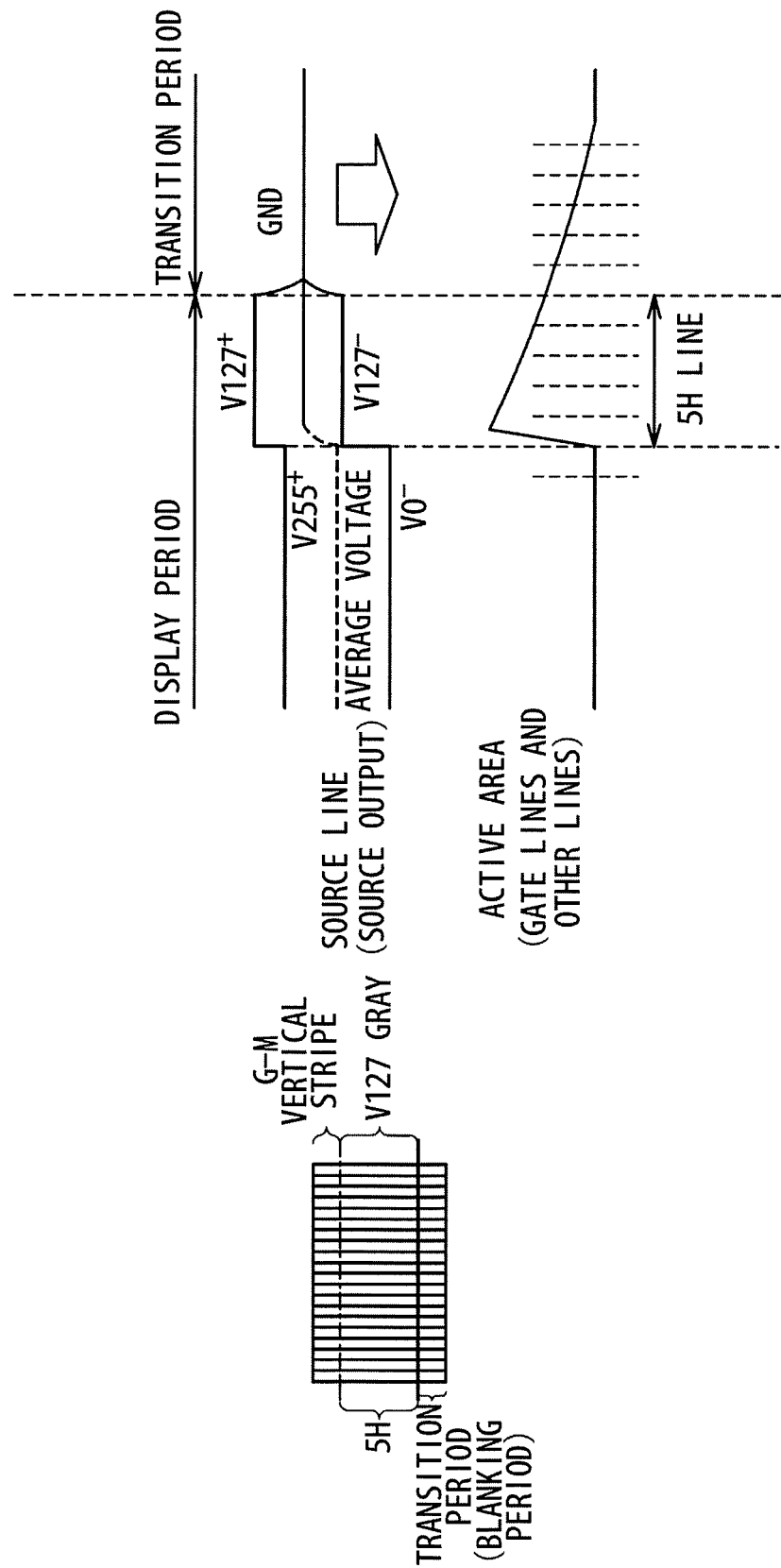
FIG. 16B is a timing chart according to one or more embodiments.

The dummy pulse output operation of this embodiment has an advantage of being able to address noise generated by changes in the display data before the end timing of the display period. FIG. 16A is a timing chart illustrating noise generated when the a G-M vertical stripe image is displayed as the entire image on the liquid crystal display panel 1, and FIG. 16B is a timing chart illustrating noise generated when a monochromic image is display in a predetermined number of the last horizontal sync periods, more specifically, the last five horizontal sync periods, and a G-M vertical stripe image is display in other horizontal sync periods according to one or more embodiments.

As described above, the dummy pulse output operation according to one or more embodiments, in which the voltage levels of the dummy pulses are determined on the basis of the display data of the last horizontal sync period of the display period, is effective for the case when the display data are unchanged over the full-screen as illustrated in FIG. 16A; however, changes in the display data in a horizontal sync period before the last horizontal sync period may hinder generation of appropriate dummy pulses.

In another embodiment, the dummy pulse output operation allows generating dummy pulses effectively addressing noise generated by changes in the display data before the start timing of the transition period, as illustrated in FIG. 16B.

Figure 17:
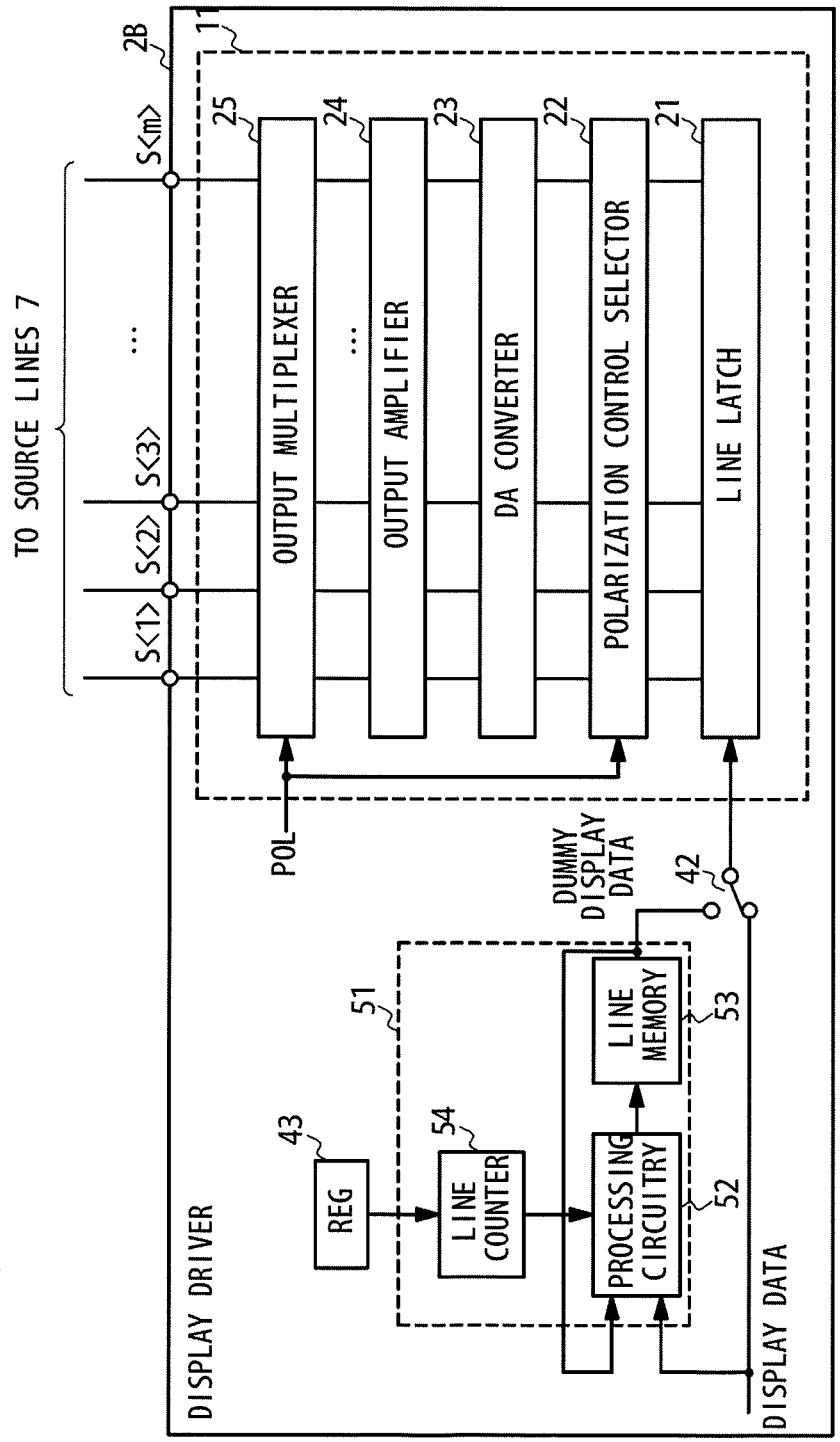
FIG. 17 is a block diagram of a display driver according to one or more embodiments.

FIG. 17 is a block diagram illustrating the configuration of a display driver 2B according to one or more embodiments. The display driver 2B includes a dummy display data generator circuitry 51 differently configured from the dummy display data generator circuitry 41 of the display driver 2A. In one or more embodiments, the panel control interface 12, the multiplexer 13, the common electrode power supply circuitry 14, the analog front end 15 and the touch controller 16 of the display driver 2B are not illustrated in FIG. 17 for simplicity of the drawing.

The dummy display data generator circuitry 51 is configured to reduce the capacity of a line memory used for calculation of the dummy display data. As illustrated in FIG. 13, the dummy display data generator circuitry 41 includes the N-line memory 44 configured to store display data associated with N horizontal lines, where N is an integer of two or more. This configuration, however, incorporate the N-line memory 44 of a large capacity, enlarging the circuit size. The dummy display data generator circuitry 51 illustrated in FIG. 17 is configured to calculate the dummy display data with a small-sized line memory.

More specifically, the dummy display data generator circuitry 51 includes a processing circuitry 52, a line memory 53 and a line counter 54.

The processing circuitry 52 is configured to generate processed display data by performing arithmetic processing on display data received in each horizontal sync period and display data stored in the line memory 53 and supply the processed display data thus generated to the line memory 53. In this processing, the processing circuitry 52 determines whether to refer to the display data supplied in each horizontal sync period from the counter value of the line counter 54 in generating the dummy display data. Details of the arithmetic processing performed by the processing circuitry 52 will be described later.

The line memory 53 is used as a work area in generating the dummy display data. The line memory 53 is configured to store therein the processed display data received from the processing circuitry 52. In this embodiment, the line memory 53 has only a capacity of storing display data of one horizontal line. When the line memory 53 receives the processed display data from the processing circuitry 52, the display data stored in the line memory 53 are updated to the processed display data.

The line counter 54 counts horizontal sync periods to output a count value. The count value of the line counter 54 identifies the current horizontal sync period.

Also in this embodiment, the dummy display data are generated on the basis of the display data in the last M horizontal sync periods in the display period, where M is an integer of one or more specified by the register value of the register 43. In one embodiment, the dummy display data may be generated on the basis of the display data in the last (k+1) horizontal sync periods, when the register value stored in the register 43 is k (also see FIG. 14).

In this embodiment, the arithmetic processing performed by the processing circuitry 52 allows storing only display data of one horizontal line in the line memory 53 in each horizontal sync period in generating the dummy display data. In the following, a description is given of the operation of the dummy display data generator circuitry 51 in this embodiment.

The line memory 53 is initially reset at the beginning of each vertical sync period. Display data describing grayscale values of "0" for the respective source lines 7 are initially stored in the line memory 53.

The display data are supplied to the line latch 21 and also to the processing circuitry 52 in each horizontal sync period.

When determining that the display data of the current horizontal sync period are to be referred to in generating the dummy display data on the basis of the count value of the line counter 54 and the register value stored in the register 43, the processing circuitry 52 performs predetermined processing on the display data received in the current horizontal sync period and generates processed display data by adding the display data obtained by this processing and the display data stored in the line memory 53.

In detail, when determining that the current horizontal sync period is the first horizontal sync period associated with display data to be referred to in generating the dummy display data on the basis of the count value of the line counter 54 and the register value stored in the register 43, the processing circuitry 52 generates the processed display data by adding the display data obtained by performing predetermined processing on the display data received in the current horizontal sync period and the display data stored in the line memory 53. The processed display data thus generated are stored in the line memory 53. Since the line memory 53 stores therein display data describing grayscale values of "0" in the first horizontal sync period associated with the display data to be referred to in generating the dummy display data, the display data obtained by performing the predetermined processing on the received display data are resultantly stored as the processed display data in the line memory 53.

Also in the next horizontal sync period, the processing circuitry 52 generates the processed display data by adding the display data obtained by performing the predetermined processing on the display data received in the next horizontal sync period and the display data stored in the line memory 53, and stores the processed display data thus generated in the line memory 53. The operation described above is repeatedly performed until the last horizontal sync period. The display data stored in the line memory 53 at the end of the last horizontal sync period are transmitted to the line latch 21 as the dummy display data used in the dummy pulse output operation.

Discussed below is an example in which the source output circuitry 11 configured as illustrated in FIG. 9 achieves column inversion drive in which, in the last M horizontal sync periods, positive drive voltages are supplied to the source line 7 connected to the source output $S_{ODD}$ and negative drive voltages are supplied to the source line 7 connected to the source output $S_{EVEN}$. In this case, the dummy display data $D_{NEGA\_AVE}$, which specifies the voltage level of a positive dummy pulse supplied to the source line 7 connected to the source output $S_{ODD}$, is calculated on the basis of the display data which specify drive voltages supplied to the source line 7 connected to the source output $S_{EVEN}$ in the last M horizontal sync periods.

Most simply, the dummy display data $D_{NEGA\_AVE}$ may be calculated as the average value of display data which specify the drive voltages supplied to the source line 7 connected to the source output $S_{EVEN}$ in the last M horizontal sync periods. In this case, in each of the last M horizontal sync periods, a processed display data is generated for the source line 7 connected to the source output $S_{EVEN}$ by adding together the display data obtained by dividing the display data received in the current horizontal sync period by M and the display data stored in the line memory 53, and the processed display data thus generated is stored in the line memory 53. The display data stored in the line memory 53 at the end of the last horizontal sync period for the source line 7 connected to the source output $S_{EVEN}$ is used as the dummy display data $D_{NEGA\_AVE}$ which specifies the voltage level of a dummy pulse to be outputted to the source line 7 connected to the source output $S_{ODD}$. The dummy display data $D_{NEGA\_AVE}$ is transmitted to the line latch 21 and used to generate the dummy pulse to be outputted to the source line 7 connected to the source output $S_{ODD}$.

Weighting depending on the horizontal sync periods may be performed in calculating the dummy display data $D_{NEGA\_AVE}$. In each of the last M horizontal sync periods, a processed display data is generated for the source line 7 connected to the source output $S_{EVEN}$ by adding together the display data stored in the line memory 53 and the display data obtained by multiplying the received display data associated with the $k^{th}$ horizontal line by $w_k/M$, and storing the processed display data thus generated into the line memory 53 to achieve the weighting based on the horizontal sync periods, where k is an integer from n−M−1 to n, and $w_k$ is a weighting factor. A person skilled in the art would understand that the above-described processing allows calculating the dummy display data $D_{NAGA\_AVE}$ given in the above-expression (1a).

The similar goes for the dummy display data $D_{POSI\_AVE}$ which specifies the voltage level of a negative dummy pulse supplied to the source line 7 connected to the source output $S_{EVEN}$. The dummy display data $D_{POSI\_AVE}$ is calculated on the basis of the display data which specify drive voltages supplied to the source line 7 connected to the source output $S_{ODD}$ in the last M horizontal sync periods.

Most simply, the dummy display data $D_{POSI\_AVE}$ may be calculated as the average value of display data which specify the drive voltages supplied to the source line 7 connected to the source output $S_{ODD}$ in the last M horizontal sync periods. In this case, in each of the last M horizontal sync periods, a processed display data is generated for the source line 7 connected to the source output $S_{ODD}$ by adding together the display data obtained by dividing the display data received in the current horizontal sync period by M and the display data stored in the line memory 53 for the source line 7 connected to the source output $S_{ODD}$, and the processed display data thus generated is stored in the line memory 53. The display data stored in the line memory 53 at the end of the last horizontal sync period for the source line 7 connected to the source output Sam is used as the dummy display data $D_{POSI\_AVE}$ which specifies the voltage level of a dummy pulse to be outputted to the source line 7 connected to the source output $S_{EVEN}$. The dummy display data $D_{POSI\_AVE}$ is transmitted to the line latch 21 and used to generate the dummy pulse to be outputted to the source line 7 connected to the source output $S_{EVEN}$.

Weighting based on the corresponding horizontal sync periods may be performed also in calculating the dummy display data $D_{POSI\_AVE}$. In each of the last M horizontal sync periods, a processed display data is generated for the source line 7 connected to the source output $S_{ODD}$, by adding together the display data stored in the line memory 53 and the display data obtained by multiplying the received display data associated with the $k^{th}$ horizontal line by $w_k/M$, and storing the processed display data thus generated into the line memory 53, to achieve the weighting based on the corresponding horizontal sync periods, where k is an integer from n−M−1 to n, and $w_k$ is a weighting factor. A person skilled in the art would understand that the above-described processing allows calculating the dummy display data $D_{POSI\_AVE}$ given in the above-expression (1b).

After the dummy pulse output operation, a transition operation is performed to drive the respective source lines 7 to the circuit ground level. FIG. 15C illustrates an exemplary operation of the source output circuitry 11 in the transition operation. In the transition operation, the switch 38 is set to connect the circuit ground line 37 to the positive output node $N_{OUTP}$. Meanwhile, the switches 39 and 40 of the output multiplexer circuitry 25 are set to connect both of the source outputs $S_{ODD}$ and $S_{EVEN}$ to the positive-side output node $N_{OUTP}$. This allows driving both of the source lines 7 connected to the source outputs $S_{ODD}$ and $S_{EVEN}$ to the circuit ground level.

The display driver 2B can generate dummy pulses effectively addressing noise generated by changes in the display data before the start timing of the transition period.

Figure 18:
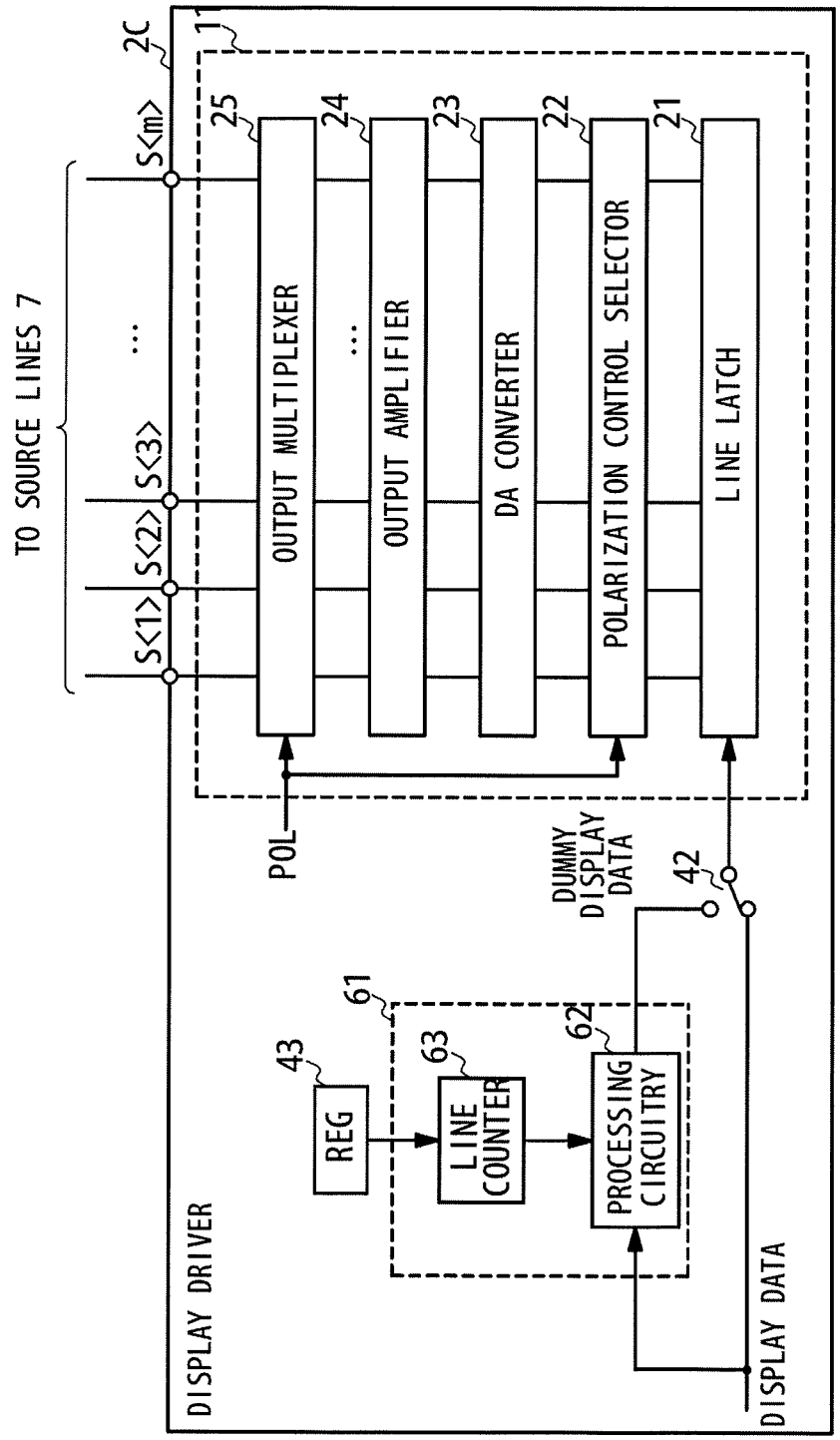
FIG. 18 is a block diagram of a display driver according to one or more embodiments.

FIG. 18 is a block diagram illustrating the configuration of the display driver 2C including a dummy display data generator circuitry 61, which is configured differently from the dummy display data generator circuitries 41 and 51 of the display drivers 2A and 2B. In one or more embodiments, the panel control interface 12, the multiplexer 13, the common electrode power supply circuitry 14, the analog front end 15 and the touch controller 16 of the display driver 2C are not illustrated in FIG. 18 for simplicity of the drawing.

The dummy display data generator circuitry 61 is configured to further reduce the capacity of a memory used to calculate dummy display data. More specifically, the dummy display data generator circuitry 61 includes a processing circuitry 62 and a line counter 63. The processing circuitry 62 generates the dummy display data on the basis of the display data of the last M horizontal sync periods, where M is specified by the register value stored in the register 43 as described above. The line counter 63 counts horizontal sync periods to output a count value which identifies the current horizontal sync period. The processing circuitry 62 refers to the count value of the line counter 63 in generating the dummy display data.

Figure 19A:
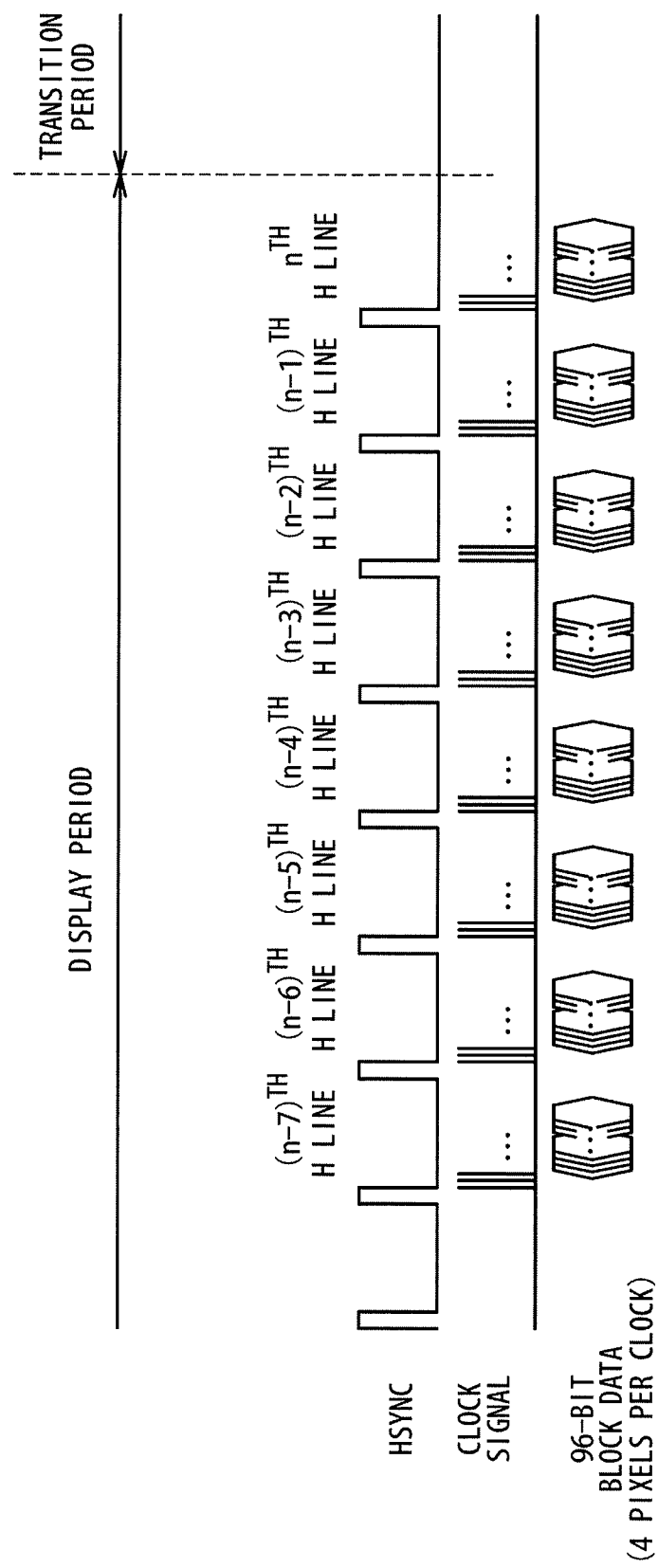
FIG. 19A schematically illustrates a format of display data according to one or more embodiments.

FIG. 19A illustrates the format of display data supplied to the processing circuitry 62 in calculating the dummy display data in one embodiment. In this embodiment, the processing circuitry 62 performs arithmetic processing in units of four pixels. In the following, four pixels treated as one unit in the arithmetic processing are collectively referred to as a "block" and display data associated with each block are referred to as "block data". When the number of pixels 10 in each horizontal line is 1080, that is, when the number of pixel circuits 8 in each horizontal line is 3240, display data of each horizontal data include 270 block data. FIG. 19A illustrates the case when dummy display data are generated on the basis of display data of the last eight horizontal sync periods, that is, M=8. In this case, display data of the $(n-7)^{th}$ to $n^{th}$ horizontal lines, in FIG. 19A, referred to as "$(n-7)^{th}$ to $n^{th}$ H LINES", are used to generate the dummy display data.

Figure 19B:
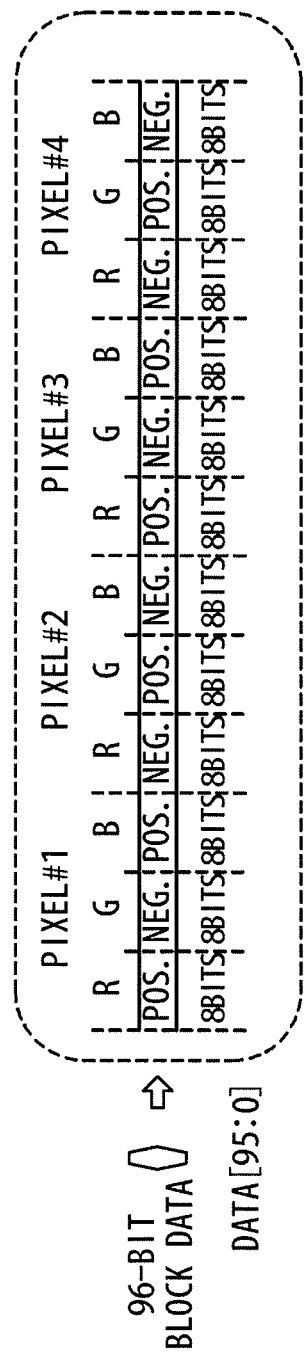
FIG. 19B schematically illustrating a format of block data according to one or more embodiments.

FIG. 19B schematically illustrates the format of a block data according to one or more embodiments. In one embodiment, in which each pixel 10 includes three pixel circuits 8, a block data describes the grayscale values of 12 pixel circuits 8. When the grayscale value of each pixel circuit 8 is described with eight bits, the block data associated with each block is a 96-bit data. With respect to two of four pixels 10 of each block, pixels #1 and #3 in FIG. 19B, pixel circuits 8 displaying red (R) and blue (B) are driven with positive drive voltages and pixel circuits 8 displaying green (G) are driven with negative drive voltages. With respect to the remaining two pixels, pixels #2 and #4 in FIG. 19B, pixel circuits 8 displaying red (R) and blue (B) are driven with negative drive voltages and pixel circuits 8 displaying green (G) are driven with positive drive voltages. Accordingly, display data associated with six of the 12 pixel circuits 8 specify positive drive voltages and display data associated with the remaining six pixels specify negative drive voltages.

In one embodiment, the voltage levels of positive dummy pulses of the dummy pulses supplied to the respective source lines 7 are equal to each other and those of negative dummy pulses are equal to each other. In the liquid crystal display panel 1, each gate line 6 intersects with all the source lines 7 and is electrically coupled to the same with capacitive coupling. Accordingly, changes in the potentials of all of the source lines 7 cause an influence on the potential of each gate line 6. Under such situations, an influence of noise can be effectively reduced even if the positive dummy pulses have the same voltage level and the negative dummy pulses have the same voltage level.

The dummy display data specifying the voltage level of the positive dummy pulses is generated on the basis of display data associated with negative drive voltages selected from the display data of the last M horizontal sync periods, while the dummy display data specifying the voltage level of the negative dummy pulses is generated on the basis of display data associated with positive drive voltages selected from the display data of the last M horizontal sync periods. This allows generating dummy pulses having appropriate voltage levels.

In the following, a description is given of the configuration and operation of the processing circuitry 62 in this embodiment.

Figure 20:
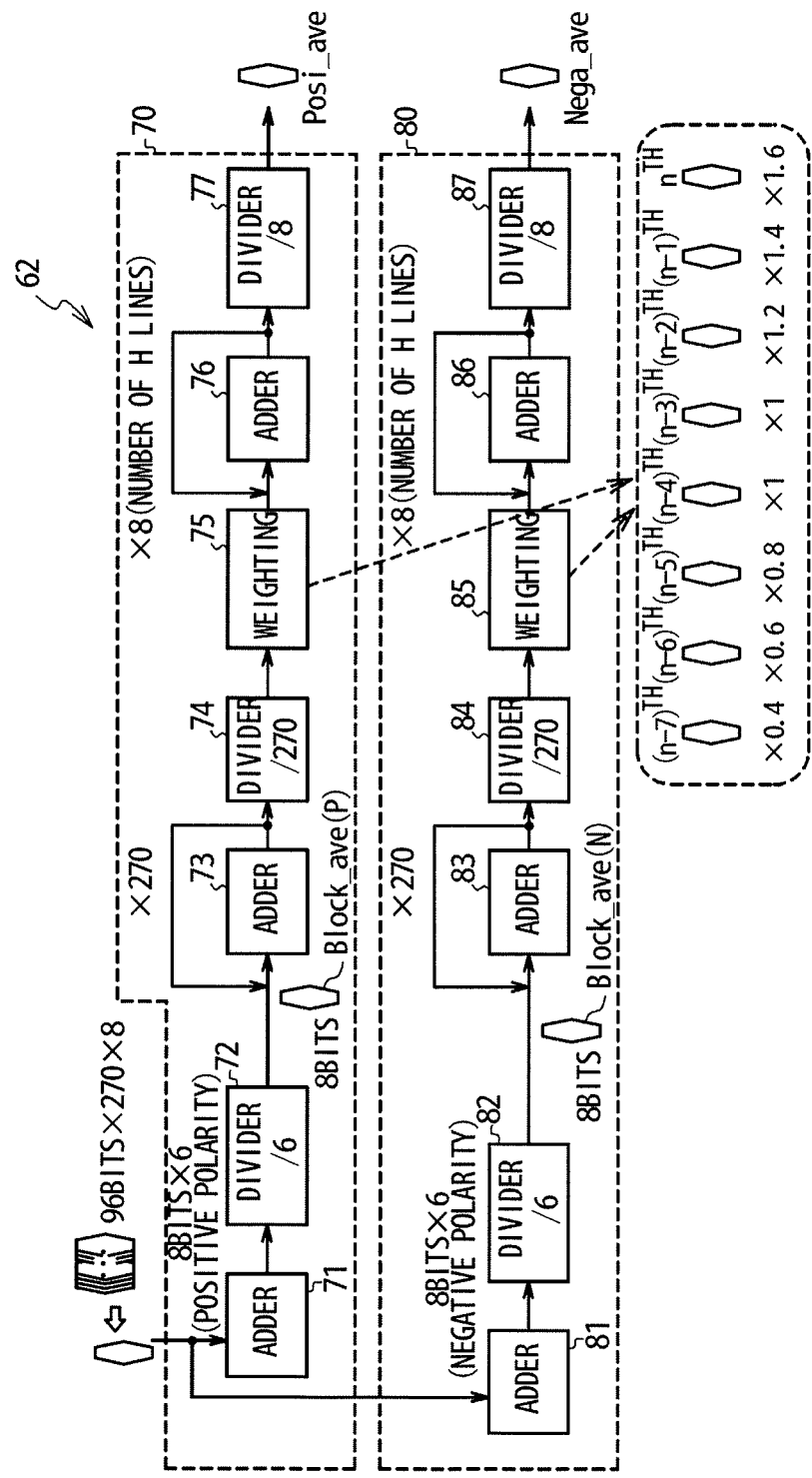
FIG. 20 is a block diagram of processing circuitry according to one or more embodiments.

FIG. 20 is a block diagram illustrating the configuration of the processing circuitry 62 according to one or more embodiments. The processing circuitry 62 includes a positive-side weighted average data calculation circuitry 70 and a negative-side weighted average data calculation circuitry 80.

In one embodiment, the positive-side weighted average data calculation circuitry 70 calculates a positive-side weighted average data Posi_ave which is an weighted average of display data associated with positive drive voltages selected out of the display data of the last M horizontal sync periods. The weighting factors by which display data are multiplied in calculating the weighted average are determined depending on the horizontal sync periods or the horizontal lines with which the display data are associated. In one or more embodiments, the positive-side weighted average data Posi_ave may be calculated as the average of the display data associated with positive drive voltages, by setting the weighting factors given to all the display data to one. As described later, the positive-side weighted average data Posi_ave is used as dummy display data indicating the voltage level of negative dummy pulses.

Similarly, the negative-side weighted average data calculation circuitry 80 calculates a negative-side weighted average data Nega_ave which is an weighted average of display data associated with negative drive voltages selected out of the display data of the last M horizontal sync periods. The weighting factors by which display data are multiplied in calculating the weighted average are determined depending on the horizontal sync periods or the horizontal lines with which the display data are associated. In one or more embodiments, the negative-side weighted average data Nega_ave may be calculated as the average of the display data associated with negative drive voltages, by setting the weighting factors given to all the display data to one. As described later, the negative-side weighted average data Nega_ave is used as dummy display data indicating the voltage level of positive dummy pulses.

The positive-side weighted average data calculation circuitry 70 includes an adder 71, a divider 72, an adder 73, a divider 74, a weighting processing unit 75, an adder 76 and a divider 77. Similarly, a negative-side weighted average data calculation circuitry 80 includes an adder 81, a divider 82, an adder 83, a divider 84, a weighting processing unit 85, an adder 86 and a divider 87.

The processing circuitry 62 operates as follows. When recognizing the beginning of the earliest one of the last M horizontal sync periods from the count value of the line counter 63, the processing circuitry 62 starts to calculate dummy display data. From then on, block data associated with the last M horizontal sync periods are sequentially supplied to the processing circuitry 62. FIG. 20 illustrates the operation of the processing circuitry 62 for M being eight; the following description is given with an assumption that M is eight. In this case, 270×8 block data are sequentially supplied to the processing circuitry 62 in total, since the number of block data associated with each horizontal line is 270, and block data associated with eight horizontal lines are supplied to the processing circuitry 62.

Figure 21:
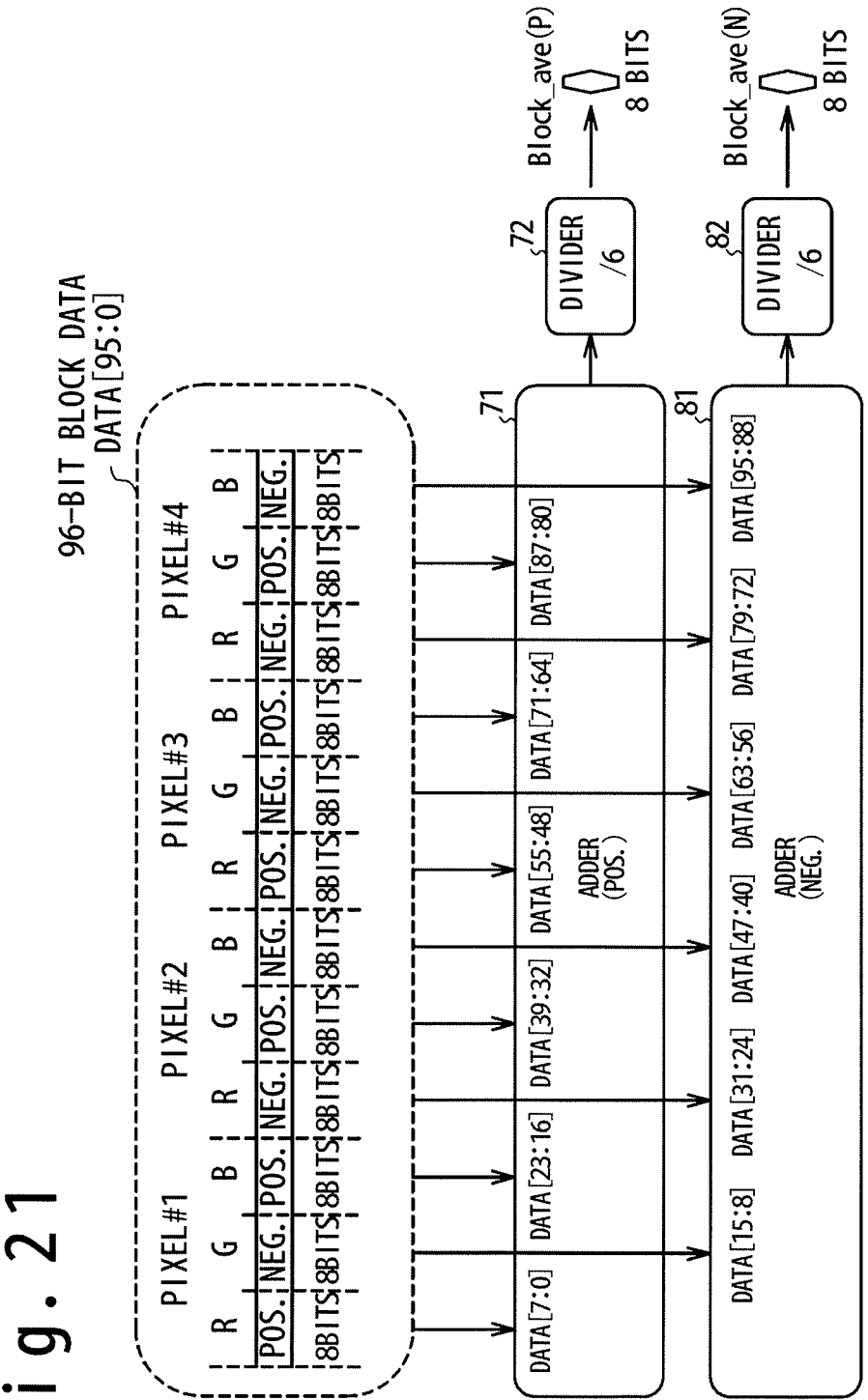
FIG. 21 schematically illustrates operations of adders and dividers according to one or more embodiments.

FIG. 21 schematically illustrates the operations of the adder 71 and the divider 72 of the positive-side weighted average data calculation circuitry 70 and the adder 81 and the divider 82 of the negative-side weighted average data calculation circuitry 80 according to one or more embodiments. Display data associated with positive drive data are supplied to the adder 71 of the positive-side weighted average data calculation circuitry 70, and display data associated with negative drive data are supplied to the adder 81 of the negative-side weighted average data calculation circuitry 80.

The adder 71 of the positive-side weighted average data calculation circuitry 70 calculates the sum of the display data associated with the positive drive voltages selected from each block data. The divider 72 obtains a positive-side block average data Block_ave(P) by dividing the sum calculated for each block data by six. The positive-side block average data Block_ave(P) indicates the average of the display data associated with the positive drive voltages selected from the block data of interest.

Similarly, the adder 81 of the negative-side weighted average data calculation circuitry 80 calculates the sum of the display data associated with the negative drive voltages selected from each block data. The divider 82 obtains a negative-side block average data Block_ave(N) by dividing the sum calculated for each block data by six. The negative-side block average data Block_ave(N) indicates the average of the display data associated with the negative drive voltages selected from the block data of interest.

Referring back to FIG. 20, the adder 73 of the positive-side weighted average data calculation circuitry 70 sequentially receives the positive-side block average data Block_ave(P) calculated for the respective block data and calculates the sum of the positive-side block average data Block_ave(P) for each horizontal line. Since display data associated with each horizontal line includes block data associated with 270 blocks in this embodiment, the adder 73 calculates the sum of the positive-side block average data Block_ave(P) associated with the 270 blocks for each horizontal line. The divider 74 calculates a positive-side horizontal line average data indicative of the average of the positive-side block average data Block_ave(P) for each horizontal line by dividing the sum outputted from the adder 73 by 270.

Similarly, the adder 83 of the negative-side weighted average data calculation circuitry 80 sequentially receives the negative-side block average data Block_ave(N) calculated for the respective block data and calculates the sum of the negative-side block average data Block_ave(N) for each horizontal line. The divider 84 calculates a negative-side horizontal line average data indicative of the average of the negative-side block average data Block_ave(N) for each horizontal line by dividing the sum outputted from the adder 83 by 270.

The weighting processing unit 75 of the positive-side weighted average data calculation circuitry 70 calculates a product by multiplying the positive-side horizontal line average data by a weighing factor for each horizontal line, where the weighting factor is determined depending on the associated horizontal line. FIG. 20 illustrates an example of the weighting factors. In the example illustrated in FIG. 20, the positive-side horizontal line average data associated with the $(n-7)^{th}$ horizontal line is multiplied by a weighting factor of 0.4, and the positive-side horizontal line average data associated with the $(n-6)^{th}$ horizontal line is multiplied by a weighting factor of 0.6. The similar applies to other horizontal lines.

Similarly, the weighting processing unit 85 of the negative-side weighted average data calculation circuitry 80 calculates a product by multiplying the negative-side horizontal line average data by a weighing factor for each horizontal line, where the weighting factor is determined depending on the associated horizontal line. In the example illustrated in FIG. 20, the negative-side horizontal line average data associated with the $(n-7)^{th}$ horizontal line is multiplied by a weighting factor of 0.4, and the negative-side horizontal line average data associated with the $(n-6)^{th}$ horizontal line is multiplied by a weighting factor of 0.6. The similar applies to other horizontal lines.

The adder 76 of the positive-side weighted average data calculation circuitry 70 calculates the sum of the products obtained by multiplying the positive-side horizontal line average data calculated for the $(n-7)^{th}$ to $n^{th}$ horizontal lines by the weighting factors. The divider 77 calculates the positive-side average data Posi_ave by dividing the sum calculated by the adder 76 by eight.

Similarly, the adder 86 of the negative-side weighted average data calculation circuitry 80 calculates the sum of the products obtained by multiplying the negative-side horizontal line average data calculated for the $(n-7)^{th}$ to $n^{th}$ horizontal lines by the weighting factors. The divider 87 calculates the negative-side average data Nega_ave by dividing the sum calculated by the adder 86 by eight.

The positive-side weighted average data Posi_ave and negative-side weighted average data Nega_ave are transmitted to the line latch 21 and used as the dummy display data indicating the voltage levels of the dummy pulses. The positive-side weighted average data Posi_ave are used as the dummy display data indicating the voltage level of the negative dummy pulses, and the negative-side weighted average data Nega_ave are used as the dummy display data indicating the voltage level of the positive dummy pulses.

Figure 22:
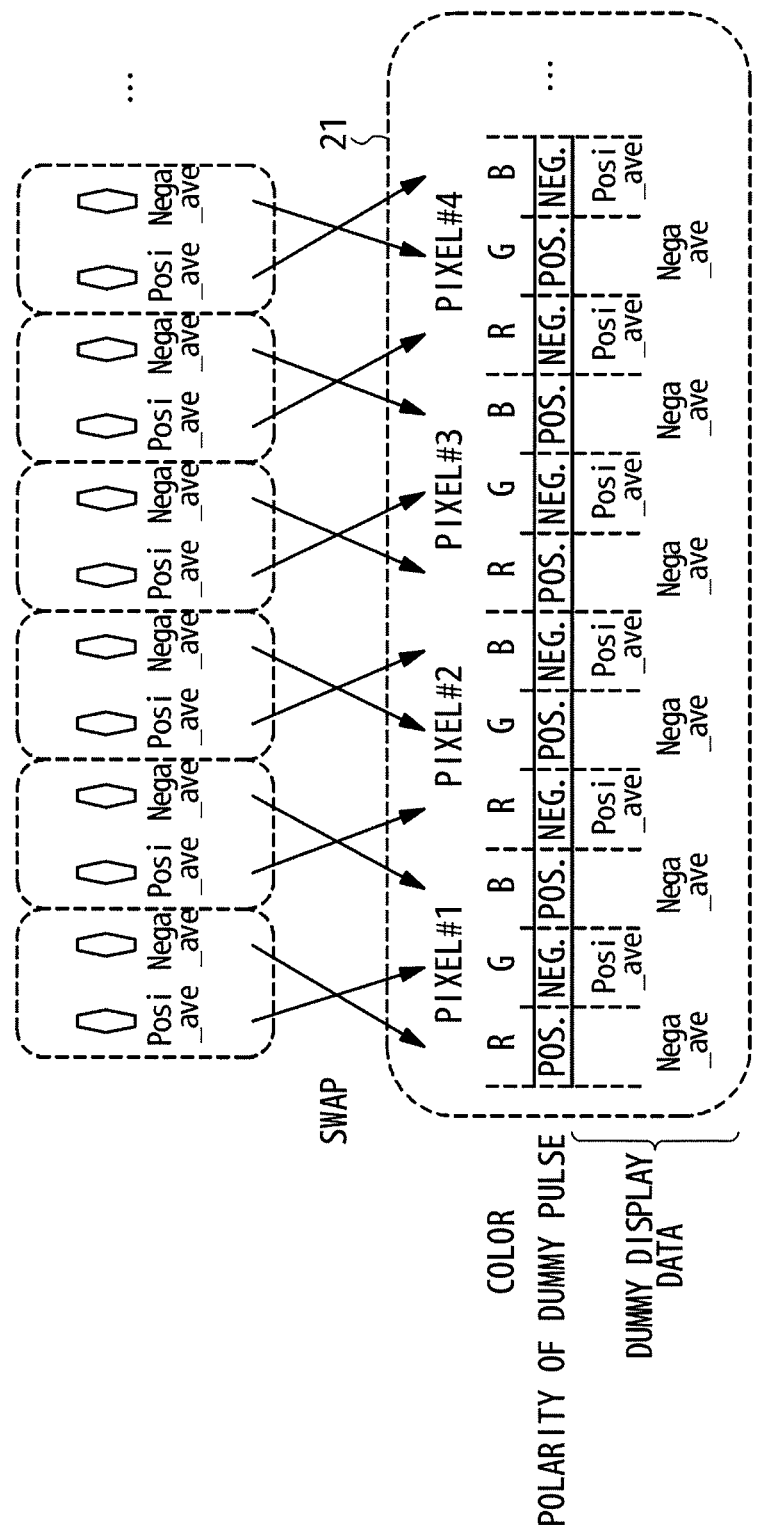
FIG. 22 illustrates a dummy pulse output operation according to one or more embodiments.

FIG. 22 illustrates a dummy pulse output operation which outputs dummy pulses to the respective source lines 7 in response to the positive-side weighted average data Posi_ave and the negative-side weighted average data Nega_ave according to one or more embodiments. In this embodiment, the voltage levels of all the positive dummy pulses are specified by the negative-side weighted average data Nega_ave. In other word, the negative-side weighted average data Nega_ave are used as dummy display data specifying the voltage level of the positive dummy pulses. Additionally, the voltage levels of all the negative dummy pulses are specified by the positive-side weighted average data Posi_ave. In other word, the positive-side weighted average data Posi_ave are used as dummy display data specifying the voltage level of the negative dummy pulses.

The dummy display data generator circuitry 61 of the display driver 2C in this embodiment, which generates the dummy display data, that is, the positive-side weighted average data Posi_ave and the negative-side weighted average data Nega_ave, through the above-described operation, can generate the dummy display data without using a memory of a large capacity such as a line memory.

Although embodiments of the present disclosure have been specifically described in the above, a person skilled in the art would appreciate that the technologies disclosed in the present disclosure may be implemented with various modifications.

What is claimed is:

1. A semiconductor device comprising:
    source output circuitry configured to:
        in a last horizontal sync period of a display period, drive a first source line of a plurality of source lines with a drive voltage having a first polarity based on first display data, and drive a second source line of the plurality of source lines with a drive voltage having a second polarity different from the first polarity based on second display data; and
        output a first dummy pulse having the first polarity to the first source line in a transition period between the display period and a touch sensing period, the first dummy pulse having a voltage level based on the second display data; and
    touch sensing circuitry configured to perform touch sensing in the touch sensing period after the display period.

2. The semiconductor device according to claim 1, wherein the source output circuitry is further configured to output a second dummy pulse having the second polarity to the second source line in the transition period, the second dummy pulse having a voltage level based on the first display data.

3. The semiconductor device according to claim 2, wherein the source output circuitry is further configured to drive the source lines to a predetermined potential in the transition period after outputting the first and second dummy pulses.

4. The semiconductor device according to claim 1, further comprising:
    dummy display data generator circuitry configured to generate first dummy display data specifying the voltage level of the first dummy pulse, based on display data associated with drive voltages having the second polarity, selected from display data specifying the drive voltages supplied to the first and second source lines in last M horizontal sync periods in the display period, where M is an integer of two or more.

5. The semiconductor device according to claim 4, wherein the source output circuitry is further configured to output a second dummy pulse having the second polarity to the second source line in the transition period, the second dummy pulse having a voltage level based on the first display data, and
    the dummy display data generator circuitry is further configured to generate second dummy display data specifying the voltage level of the second dummy pulse, based on display data associated with drive voltages having the first polarity, selected from the display data specifying the drive voltages supplied to the first and second source lines in the last M horizontal sync periods.

6. The semiconductor device according to claim 4, wherein the dummy display data generator circuitry is configured to calculate the first dummy display data as a first weighted average of the display data associated with drive voltages having the second polarity and selected from the display data specifying the drive voltages supplied to the first and second source lines in the last M horizontal sync periods.

7. The semiconductor device according to claim 6, wherein the source output circuitry is further configured to output a second dummy pulse having the second polarity to the second source line in the transition period, and
the dummy display data generator circuitry is configured to calculate a second dummy display data as a second weighted average of the display data associated with drive voltages having the first polarity and selected from the display data specifying the drive voltages supplied to the first and second source lines in the last M horizontal sync periods.

8. The semiconductor device according to claim 7, wherein weighting factors applied to the display data associated with the drive voltages having the second polarity in the calculation of the first and second weighted averages are determined based on horizontal sync periods associated with the display data the weighting factors are applied.

9. The semiconductor device according to claim 4, wherein the dummy display data generator circuitry comprises:
a counter configured to count horizontal sync periods in the display period;
a line memory configured to store display data associated with one horizontal line; and
processing circuitry configured to, in response to a counter value received from the counter:
calculate processed display data by processing display data supplied to the processing circuitry in each horizontal sync period and display data stored in the line memory; and
update the display data stored in the line memory to the processed display data, and
wherein, in the transition period, the display data stored in the line memory and associated with the first source line is supplied to the source output circuitry as the first dummy display data.

10. The semiconductor device according to claim 1, further comprising:
a register configured to store therein a register value; and
dummy display data generator circuitry configured to generate first dummy display data specifying the voltage level of the first dummy pulse, based on display data associated with drive voltages having the second polarity, selected from display data specifying the drive voltages supplied to the first and second source lines in last M horizontal sync periods in the display period, where M is an integer of one or more specified by the register value.

11. The semiconductor device according to claim 10, wherein the source output circuitry is further configured to output a second dummy pulse having the second polarity to the second source line in the transition period, and
the dummy display data generator circuitry is further configured to generate second dummy display data specifying the voltage level of the second dummy pulse, based on display data associated with drive voltages having the first polarity, selected from the display data specifying the drive voltages supplied to the first and second source lines in the last M horizontal sync periods.

12. A display device, comprising:
a display panel comprising a plurality of source lines;
source output circuitry configured to:
in a last horizontal sync period of a display period, drive a first source line of the plurality of source lines with a drive voltage having a first polarity based on first display data, and drive a second source line of the plurality of source lines with a drive voltage having a second polarity different from the first polarity based on second display data; and
drive the first source line with a first dummy pulse having the first polarity in a transition period between the display period and a touch sensing period, the first dummy pulse having a voltage level based on the second display data; and
touch sensing circuitry configured to perform touch sensing on the display panel in the touch sensing period after the display period.

13. The display device according to claim 12, wherein the source output circuitry is further configured to drive the second source line with a second dummy pulse having the second polarity in the transition period, the second dummy pulse having a voltage level based on the first display data.

14. The display device according to claim 13, wherein the source output circuitry is further configured to drive the source lines to a predetermined potential in the transition period after outputting the first and second dummy pulses.

15. The display device according to claim 12, further comprising:
dummy display data generator circuitry configured to generate first dummy display data specifying the voltage level of the first dummy pulse, based on display data associated with drive voltages having the second polarity, selected from display data specifying the drive voltages supplied to the first and second source lines in last M horizontal sync periods in the display period, where M is an integer of two or more.

16. The display device according to claim 15, wherein the source output circuitry is further configured to output a second dummy pulse having the second polarity to the second source line in the transition period, the second dummy pulse having a voltage level based on the first display data, and
the dummy display data generator circuitry is further configured to generate second dummy display data specifying the voltage level of the second dummy pulse, based on display data associated with drive voltages having the first polarity, selected from the display data specifying the drive voltages supplied to the first and second source lines in the last M horizontal sync periods.

17. The semiconductor display device according to claim 15, wherein the dummy display data generator circuitry is configured to calculate the first dummy display data as a first weighted average of the display data associated with drive voltages having the second polarity and selected from the display data specifying the drive voltages supplied to the first and second source lines in the last M horizontal sync periods.

18. The display device according to claim 12, further comprising:
a register configured to store therein a register value; and
dummy display data generator circuitry configured to generate first dummy display data specifying the voltage level of the first dummy pulse, based on display data associated with drive voltages having the second polarity, selected from display data specifying the drive voltages supplied to the first and second source lines in last M horizontal sync periods in the display period, where M is an integer of one or more specified by the register value.

19. A method of operating a display device, the method comprising:

supplying a first drive voltage having a first polarity to a first source line of a display panel of the display device in a final horizontal sync period of a display period, the first drive voltage having a voltage level based on first display data;

supplying a second drive voltage having a second polarity different from the first polarity to a second source line of the display panel in the final horizontal sync period, the second drive voltage having a voltage level based on a second display data;

outputting a first dummy pulse having the first polarity to the first source line in a transition period following the display period, the first dummy pulse having a voltage level based on the second display data;

driving the first and second source lines to a predetermined potential after the transition period; and performing touch sensing on the display panel in a touch sensing period following the transition period.

20. The method according to claim 19, further comprising:

outputting a second dummy pulse having the second polarity and a voltage level based on the first display data to the second source line in the transition period.

* * * * *